US008659709B2

(12) United States Patent
Hanaoka et al.

(10) Patent No.: US 8,659,709 B2
(45) Date of Patent: Feb. 25, 2014

(54) DISPLAY DEVICE AND TELEVISION RECEIVER

(75) Inventors: Tohru Hanaoka, Osaka (JP); Fumio Kokubo, Osaka (JP); Eiji Kurimoto, Osaka (JP); Ryoji Ishimura, Osaka (JP); Shota Inoue, Osaka (JP); Fumiaki Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/990,026

(22) PCT Filed: Nov. 24, 2011

(86) PCT No.: PCT/JP2011/077032

§ 371 (c)(1), (2), (4) Date: May 28, 2013

(87) PCT Pub. No.: WO2012/073782

PCT Pub. Date: Jun. 7, 2012

(65) Prior Publication Data

US 2013/0250187 A1 Sep. 26, 2013

(30) Foreign Application Priority Data

Nov. 30, 2010 (JP) ................................ 2010-267044

(51) Int. Cl.
*H04N 3/14* (2006.01)

(52) U.S. Cl.
USPC ........... 348/790; 348/602; 348/645; 348/647; 348/655; 348/674; 348/687; 345/691; 345/690; 345/698; 345/207; 345/211; 345/82

(58) Field of Classification Search
USPC ......... 348/790, 602, 645, 647, 655, 674, 687; 345/691, 690, 698, 207, 211, 82
See application file for complete search history.

(56) References Cited

U.S. PATENT DOCUMENTS

| | | | | |
|---|---|---|---|---|
| 8,427,405 | B2 * | 4/2013 | Takasugi | 345/82 |
| 2003/0189693 | A1 * | 10/2003 | Ishino | 353/31 |
| 2010/0020065 | A1 * | 1/2010 | Takasugi | 345/214 |
| 2010/0053136 | A1 * | 3/2010 | Ohta et al. | 345/211 |
| 2010/0201900 | A1 * | 8/2010 | Lee et al. | 349/40 |
| 2012/0189958 | A1 * | 7/2012 | Chang et al. | 430/139 |

FOREIGN PATENT DOCUMENTS

JP H06-217243 A 8/1994

* cited by examiner

*Primary Examiner* — Jefferey Harold
*Assistant Examiner* — Mustafizur Rahman
(74) *Attorney, Agent, or Firm* — Chen Yoshimura LLP

(57) ABSTRACT

An object of the present invention is to obtain a display device having excellent display quality by appropriately modifying the chromaticity of images. In this display device, a correction processing part (CPU 30) determines a first chromaticity change amount stored in memory (31) on the basis of a first cumulative usage amount, which is the cumulative usage amount of an LED (17) up to a present time, the cumulative value having been measured by a counter (32), and the correction processing part also determines a second chromaticity change amount stored in the memory (31) on the basis of a second cumulative usage amount, which is the cumulative usage amount of the LED (17) up to a time when the chromaticity of a pixel is adjusted by a chromaticity adjusting part (CPU 30), the cumulative value having been measured by the counter (32). Then, by subtracting the second chromaticity change amount from the first chromaticity change amount, the correction processing part obtains the value to which the chromaticity is to be modified, and modifies an image signal on the basis of the value to which the chromaticity is to be modified.

19 Claims, 17 Drawing Sheets

| LED Cumulative Illumination Time (h) | Image Chromaticity Change Amount | |
|---|---|---|
| | Δx | Δy |
| 0 | 0.000 | 0.000 |
| 5 | 0.003 | 0.007 |
| 10 | 0.006 | 0.012 |
| 15 | 0.007 | 0.015 |
| 20 | 0.008 | 0.017 |
| ⋮ | ⋮ | ⋮ |
| ≧200 | 0.015 | 0.030 |

DISPLAY DEVICE AND TELEVISION RECEIVER

TECHNICAL FIELD

The present invention relates to a display device and a television receiver.

BACKGROUND ART

A liquid crystal panel used in a liquid crystal display device such as a liquid crystal television, for example, does not emit light, and thus, it is necessary to provide a separate backlight device as an illumination device. One known example of this type of liquid crystal display device is that disclosed in Patent Document 1 below.

The device disclosed in Patent Document 1 illuminates a liquid crystal panel with light from a light source, and projects an image generated by the transmitted light onto a screen using a projection lens. In this type of device, a metal-halide lamp is used as the light source, and thus, there was a problem that over an extended period of time, color unevenness developed in the emitted light. As a countermeasure, in Patent Document 1, deterioration of the displayed image is mitigated by modifying the image signal displayed in the liquid crystal panel based on the real usage amount of the light source.

RELATED ART DOCUMENT

Patent Document

Patent Document 1: Japanese Patent Application Laid-Open Publication No. H6-217243

Problems to be Solved by the Invention

Patent Document 1 describes a configuration in which an image signal is modified based on the real usage amount of the light source from initial start of illumination. Thus, during the manufacturing process of the liquid crystal display device or when repairs are conducted to fix a malfunction, for example, if white balance adjustment is conducted on the displayed image, and the chromaticity of the displayed image is manually changed as a result, then the modifications of the image signals are no longer ideal, which presents the risk that the chromaticity of the displayed image becomes unnatural.

SUMMARY OF THE INVENTION

The present invention was completed in view of the situation described above, and an object thereof is to attain an excellent display quality by appropriately modifying the chromaticity of the image.

Means for Solving the Problems

A display device of the present invention includes: an image display part having a plurality of pixels for displaying an image based on an image signal; a chromaticity adjusting part that adjusts chromaticity of the pixels; a light source that supplies light to the image display part; a usage amount measuring part that measures a cumulative usage amount of the light source; a memory that stores in advance data relating to an amount of chromaticity change in relation to the cumulative usage amount of the light source; and a correction processing part that conducts a process to modify the image signal based on the data stored in the memory and the cumulative usage amount of the light source measured by the usage amount measuring part, to compensate for chromaticity shift over time, wherein the correction processing part determines a first chromaticity change amount from the data stored in the memory, with reference to a first cumulative usage amount that is a total cumulative usage amount of the light source measured by the usage amount measuring part up to the present, the correction processing part determines a second chromaticity change amount from the data stored in the memory, with reference to a second cumulative usage amount that is measured by the usage amount measuring part and that is a cumulative usage amount of the light source up to when the chromaticity of the pixels was adjusted by the chromaticity adjusting part, and the correction processing part obtains a target value to which chromaticity modification is performed by subtracting the second chromaticity change amount from the first chromaticity change amount, and modifies the image signal based on the target value to which the chromaticity modification is to be performed.

The chromaticity of the image displayed in the image display part can change based on the cumulative usage amount of the light source. As a countermeasure, in the manufacturing process and the like of the display device, for example, the chromaticity is adjusted for each pixel constituting an image by the chromaticity adjusting part. As the chromaticity of each pixel is adjusted, the chromaticity of the image constituted of the respective pixels can change to a value that is not continuous to the change in chromaticity occurring due to the usage of the light source. Furthermore, variation can occur in the cumulative usage amount of the light source up to when the chromaticity is adjusted for each pixel, and thus, in addition to the variation that occurs in the cumulative usage amount of the light source up to when the chromaticity is adjusted for each pixel, variation also occurs in the amount of change in chromaticity of the image due to the usage of the light source. Thus, if the chromaticity of the image is simply modified based only on the cumulative usage amount of the light source up to the present, then the modified chromaticity of the image may become different from the chromaticity at the time when the above-mentioned adjustment has taken place, and the value may become varied along with the cumulative usage amount of the light source up to when chromaticity adjustment is conducted for each pixel, and thus, the value may become a non-ideal value.

In the present invention, the usage amount measuring part measures the cumulative usage amount of the light source, and the correction processing part conducts a process to modify the image signal based on the data stored in the memory in advance and the cumulative usage amount of the light source measured by the usage amount measuring part. Specifically, the correction processing part determines the first change amount of the chromaticity of the image stored in the memory based on the first cumulative usage amount, which is a cumulative usage amount of the light source up to the present measured by the usage amount measuring part, and the correction processing part also determines the second change amount of the chromaticity of the image stored in the memory based on the second cumulative usage amount, which is a cumulative usage amount of the light source up to when the chromaticity of the pixels measured by the usage amount measuring part is adjusted. The correction processing part subtracts the second change amounts from the first change amounts and obtains the value to which the chromaticity is to be modified, and modifies the image signal based on the value to which the chromaticity is to be modified. Thus, the chromaticity of the image can be reverted to the value at the time when the chromaticity of each pixel was adjusted, thus allowing the chromaticity of the image to be adjusted to an ideal value. Furthermore, the chromaticity of the image to be modified by the correction processing part is at a value that is the same as when the chromaticity is adjusted for each pixel regardless of variation in the cumulative usage amount of the light source up to when the chromaticity of each pixel is adjusted, and thus, variation in the modified chromaticity of the image is also prevented. Thus, it is possible to attain an excellent display quality.

As embodiments of the present invention, the following configurations are preferable. (1) The usage amount measuring part measures a cumulative illumination time as the usage amount of the light source. With this configuration, when compared to a case in which the amount of light emitted or the amount of energy consumed is measured as the usage amount of the light source, it is possible to have a simple configuration for the usage amount measuring part.

(2) The correction processing part conducts the process to modify the image signal every time the cumulative usage amount of the light source reaches a certain value. In this manner, the chromaticity of the displayed image is modified to an ideal value periodically, making this configuration suitable in allowing an excellent display quality to be maintained.

(3) The display device further includes an optical member that applies an optical effect on light from the light source and outputs the light to the image display part, wherein the memory stores in advance data relating to the amount of chromaticity change in an image displayed by transmitting light through the optical member, in relation to the cumulative usage amount of the light source. With this configuration, light from the light source is transmitted through the optical member with a prescribed optical effect applied on the light, and the light is outputted to the image display part, thus contributing to the display of an image. The optical member has optical properties that can change due to light from the light source being radiated thereon, and the chromaticity of light transmitted through the optical member and outputted to the image display part, or in other words the chromaticity of the image (each pixel) displayed in the image display part, can change. Even in this case, the correction processing part can modify the image signal to an appropriate value based on the data relating to the amount of change in the chromaticity of the image displayed by light transmitted through the optical members in relation to the cumulative usage amount of the light source, and thus, an excellent display quality can be attained.

(4) The optical member is made of a polyester resin. Polyester resin has excellent heat resistance and mechanical strength compared to other resins, and by using this material for the optical members, the optical members are not susceptible to changes in shape when heat or an external force is applied thereon, thus increasing the product reliability of the display device. In addition, with this configuration, even if the optical members made of polyester resin are used, it is possible to modify the image signal to an appropriate value using the correction processing part, and thus, an excellent display quality can be attained.

(5) The optical member is made of polyethylene terephthalate (PET). Among polyester resins, PET is particularly inexpensive and is recyclable with ease, and thus, by using PET as a material for the optical members, it is possible to attain a display device that is inexpensive and environmentally friendly. In addition, with this configuration, even if the optical members made of PET are used, it is possible to modify the image signal to an appropriate value using the correction processing part, and thus, an excellent display quality can be attained.

(6) The display device further includes a second cumulative usage amount sampler that stores in the memory as the second cumulative usage amount a measured value measured by the usage amount measuring part up to a point in time when chromaticity of the pixels is adjusted by the chromaticity adjusting part, wherein the correction processing part conducts the process to modify the image signal by obtaining the data and the second cumulative usage amount from the memory, and obtaining a present value measured by the usage amount measuring part as the first cumulative usage amount. With this configuration, the measured value by the usage amount measuring part up to the point when the chromaticity of the pixels adjusted by the chromaticity adjusting part is stored as the second cumulative usage amount in the memory by the second cumulative usage amount sampler. The first cumulative usage amount is the measured value by the usage amount measuring part for when the modification process is conducted (the present), and thus, it is possible to have a simplified configuration compared to a case in which separate usage amount measuring parts are provided for measuring the first cumulative usage amount and for measuring the second cumulative usage amount.

(7) Functions of the correction processing part and the second cumulative usage amount sampler are fulfilled by a central processing unit (CPU). With this configuration, it is possible to simplify the configuration compared to a case in which the correction processing part and the second cumulative usage amount sampler are independent of each other.

(8) The usage amount measuring part, the memory, and the central processing unit are provided on a same substrate. If the usage amount measuring part, the memory, and the CPU were respectively provided on separate substrates, it would be necessary to provide wiring in order to transmit data between the substrates, whereas with this configuration, such wiring lines are unnecessary, and thus, this configuration is suitable in being simple.

(9) The second cumulative usage amount sampler stores in the memory as the second cumulative usage amount a measured value measured by the usage amount measuring part up to a point in time when the chromaticity of the pixels is last adjusted, if the chromaticity of the pixels is to be adjusted a plurality of times. With this configuration, even if the chromaticity of the pixels is to be adjusted a plurality of times, the correction processing part can appropriately modify the image signal based on an appropriate second cumulative usage amount sampled by the second cumulative usage amount sampler, thus allowing an excellent display quality.

(10) The chromaticity adjusting part adjusts the chromaticity of the pixels by adjusting a $\gamma$ value that is a ratio of a brightness of the pixels to an input gradation level of the image signal. With this configuration, by having the chromaticity adjusting part adjust the $\gamma$ value, the chromaticity of each pixel is adjusted to an appropriate value, and it is thus possible to attain excellent image chromaticity.

(11) The display device further includes a gradation conversion part that converts the input gradation level of the image signal based on the $\gamma$ value to a converted gradation level that has a linear relation to an output gradation level of the pixels, the gradation conversion part outputting a converted signal based on the converted gradation level to the image display part. With this configuration, the converted signal, which is based on the converted gradation level in which the input gradation level is converted based on the $\gamma$ value adjusted by the chromaticity adjusting part, is outputted to the image display part, thus allowing an image with an appropriate chromaticity to be displayed in the image display part.

(12) The display device further includes a timing controller that outputs the converted signal outputted from the gradation conversion part to the image display part at a prescribed timing. With this configuration, it is possible to display an image with an appropriate chromaticity in the image display part by having the timing controller output the converted signal to the image display part at an appropriate timing.

(13) The image display part includes the plurality of pixels with respective colors differing from each other, and displays the image based on a plurality of said image signals corresponding to the pixels of the respective colors, whereas the chromaticity adjusting part adjusts a white balance of the image by adjusting the γ value for each color. With this configuration, it is possible to adjust the white balance of the image constituted of each pixel to an appropriate level using the chromaticity adjusting part.

(14) The light source is an LED. With this configuration, the brightness can be increased, energy consumption can be decreased, and the like.

(15) The display device further includes an optical member that applies an optical effect on light from the LED, the optical member outputting the light to the image display part, wherein the LED is constituted of an LED element that emits substantially only blue light, and a fluorescent material that is excited by light from the LED element, thereby emitting light. With this configuration, light emitted from the LEDs includes a large amount of light in the blue wavelength region. Light in the blue wavelength region has a tendency to change the optical properties of the optical members. The correction processing part can modify the image signal appropriately as a countermeasure against changes in optical properties of the optical members resulting from light from the LEDs, thus allowing a high display quality to be maintained.

(16) The display device further includes a light guide member that is disposed such that an edge thereof faces the light source and that guides light from the light source to the image display part. With this configuration, light emitted by the light source is radiated on an edge of the light guide member disposed facing the light source, guided efficiently to the image display part, and efficiently outputted.

(17) The image display part is a liquid crystal panel constituted of a pair of substrates with liquid crystal sealed therebetween. As a liquid crystal display device, such a display device can be applied to various applications such as a television or the display of a personal computer, for example, and is particularly suitable for large screens.

Effects of the Invention

According to the present invention, it is possible to attain excellent display quality by appropriately modifying the chromaticity of the image.

DETAILED DESCRIPTION OF EMBODIMENTS

Embodiment 1

Figure 2:
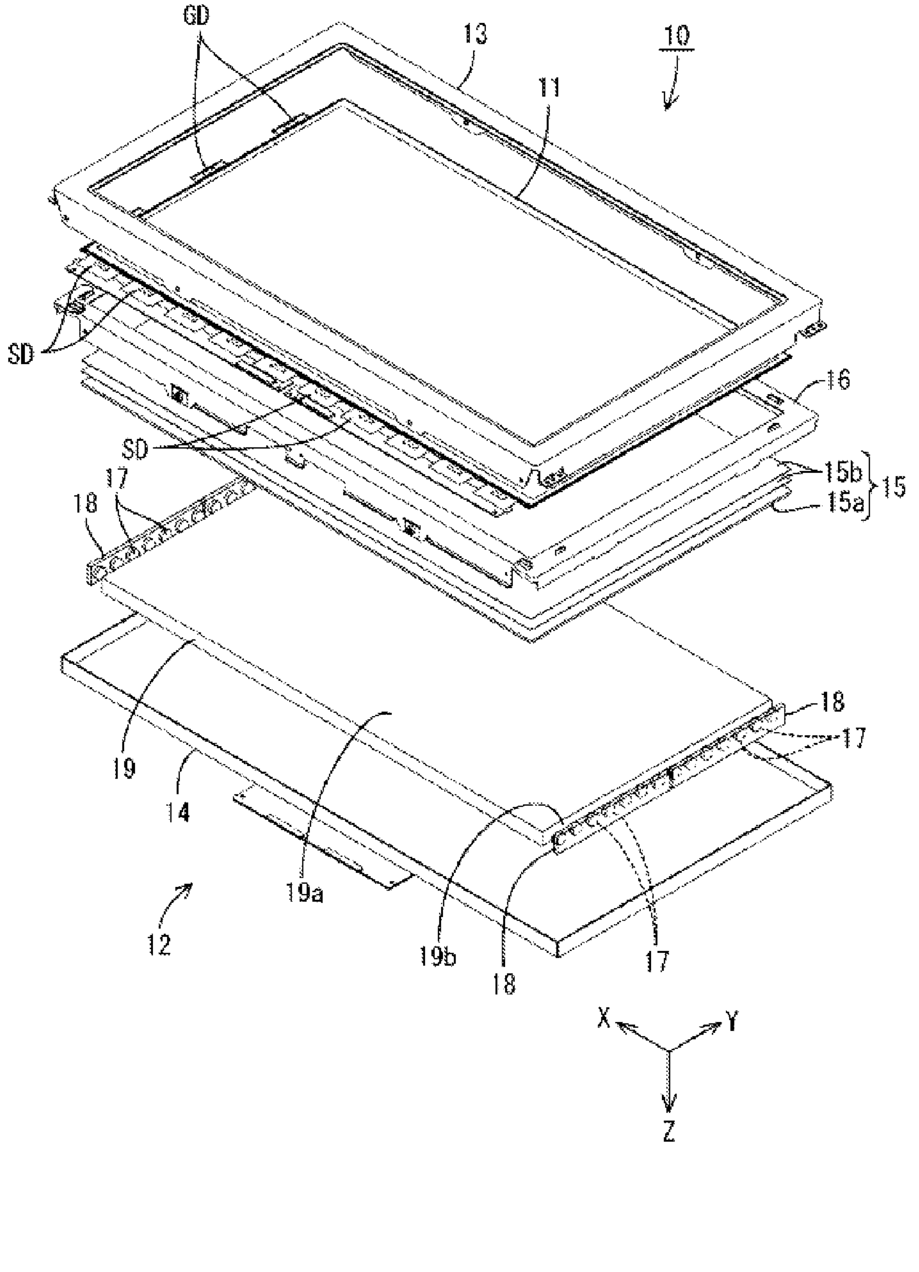
FIG. 2 is an exploded perspective view that shows a schematic configuration of a liquid crystal display device provided in the television receiver.
Figure 3:
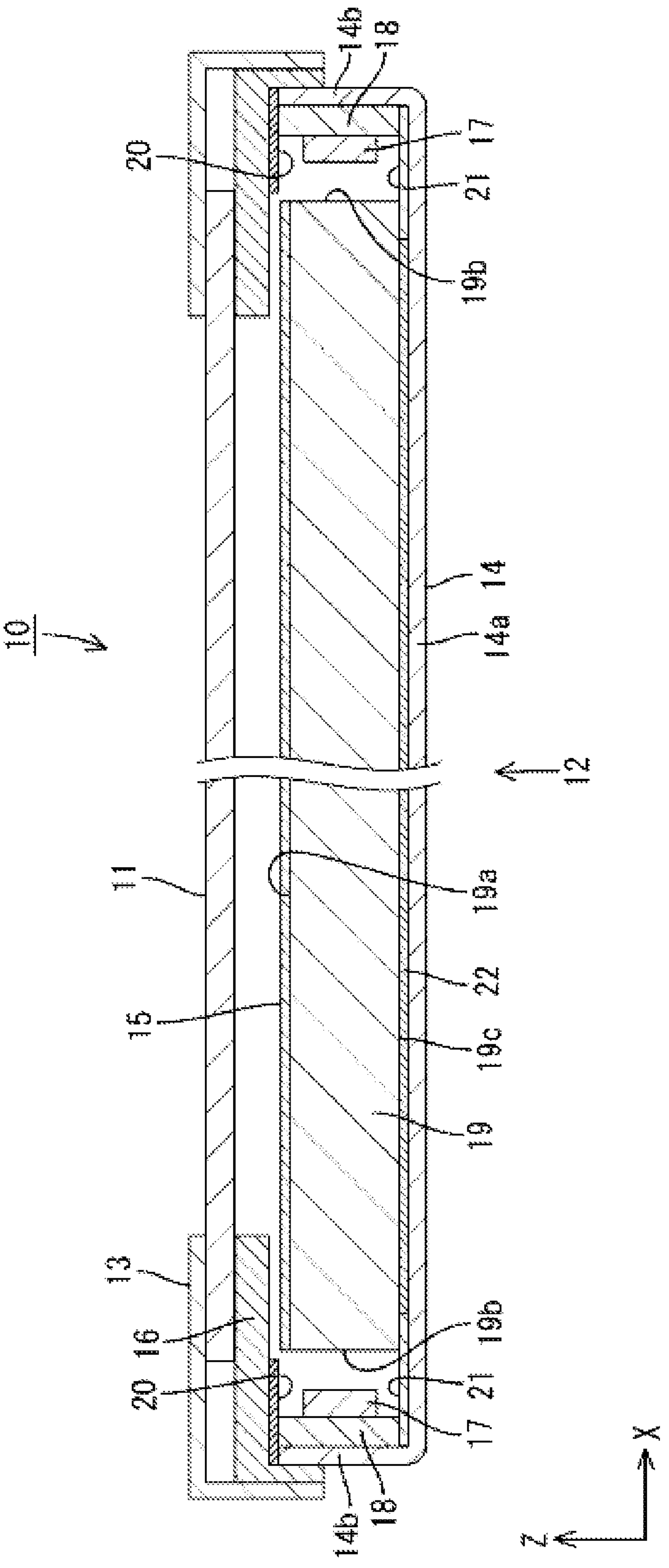
FIG. 3 is a cross-sectional view that shows a cross-sectional configuration of the liquid crystal panel along the lengthwise direction.

Embodiment 1 of the present invention will be described with reference to FIGS. 1 to 17. In the present embodiment, a liquid crystal display device 10 will be described as an example. Some of the drawings indicate an X axis, a Y axis, and a Z axis in a portion of the drawings, and each of the axes indicates the same direction for the respective drawings. The upper side of FIG. 3 is the front side, and the lower side is the rear side.

Figure 1:
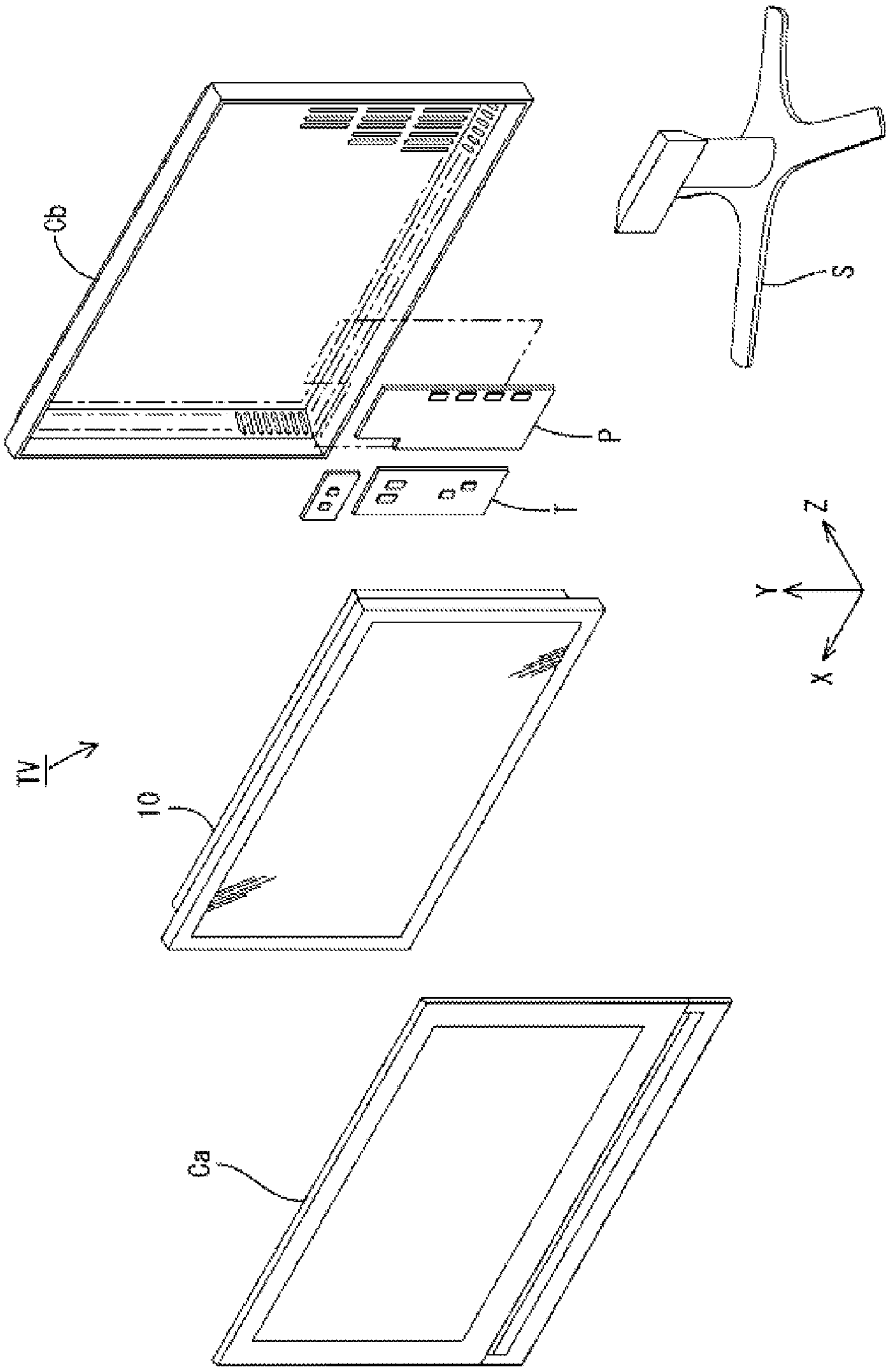
FIG. 1 is an exploded perspective view that shows a schematic configuration of a television receiver according to Embodiment 1 of the present invention.

As shown in FIG. 1, a television receiver TV according to the present embodiment includes the liquid crystal display device 10, front and rear cabinets Ca and Cb, which store the liquid crystal display device 10 therebetween, a power source substrate P, a tuner substrate (television substrate and main substrate) T, and a stand S. The liquid crystal display device (display device) 10 is rectangular with a long side being in the horizontal direction, and is stored upright. As shown in FIG. 2, the liquid crystal display device 10 includes a liquid crystal panel (image display part) 11 that is a display panel, and a backlight device (illumination device) 12 that is an external light source, and these are held together integrally using a frame shaped bezel 13 or the like.

The liquid crystal panel 11 will be described. As shown in FIG. 2, the liquid crystal panel 11 includes a pair of transparent (having a light-transmitting property) glass substrates that are rectangular, and a liquid crystal layer (not shown in drawings) that is interposed between the substrates and that includes liquid crystal molecules, which change in optical properties based on an applied electric field, and the substrates are bonded together with a sealing agent that is not shown in drawings while maintaining a gap equal in thickness to the liquid crystal layer. Of the substrates, the front side substrate is the CF substrate and the rear side substrate is the array substrate. Polarizing plates are disposed respectively on the outer sides of the substrates.

Figure 4:
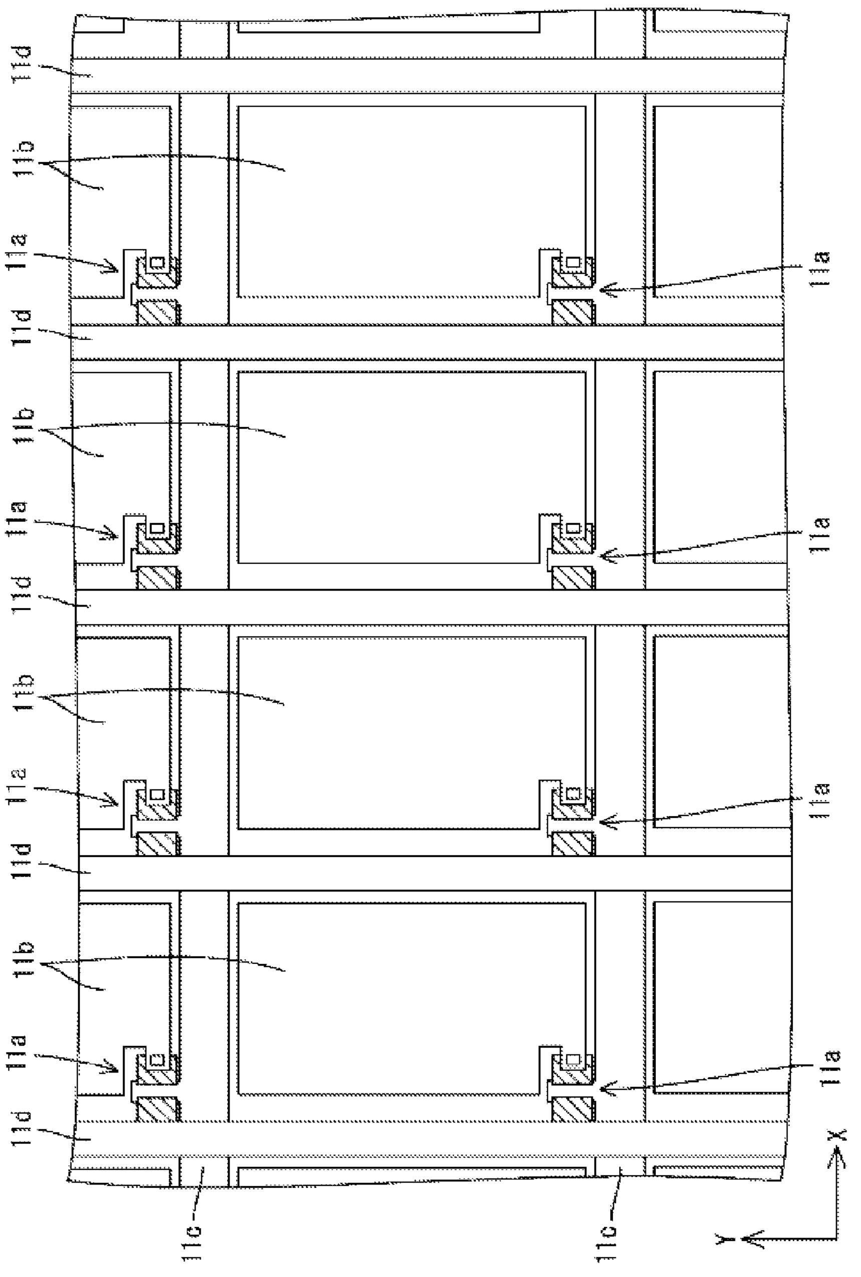
FIG. 4 is a magnified plan view that shows a plan view configuration of an array substrate.

As shown in FIG. 4, on the inner surface side of the array substrate (liquid crystal layer side, surface facing the CF substrate), a plurality of TFTs (thin film transistors) 11*a*, which are switching elements, and pixel electrodes 11*b* are provided, and gate wiring lines 11*c* and source wiring lines 11*d* are disposed in a grid pattern so as to form frames around each set of a TFT 11*a* and a pixel electrode 11*b*. The gate wiring lines 11*c* and the source wiring lines 11*d* are made of copper, which has a conductive property and a light-shielding property (a metal having a light-shielding property). Each of the gate wiring lines 11*c* and each of the source wiring lines 11*d* are connected to the gate electrode and the source electrode of each TFT 11*a*, and each pixel electrode 11*b* is connected to the drain electrode of each TFT 11*a*. On edges of the array substrate, terminal parts drawn from the gate wiring lines 11*c* and terminal parts drawn from the source wiring lines 11*d* are provided, and as shown in FIG. 2, each terminal part is respectively connected to a corresponding gate driver GD or a corresponding source driver SD via an anisotropic conductive film. The gate drivers GD and the source drivers SD can supply signals outputted from a TCON substrate 23 to be described later to the gate wiring lines 11*c* and the source wiring lines 11*d* and drive the TFTs 11*a*.

Figure 5:
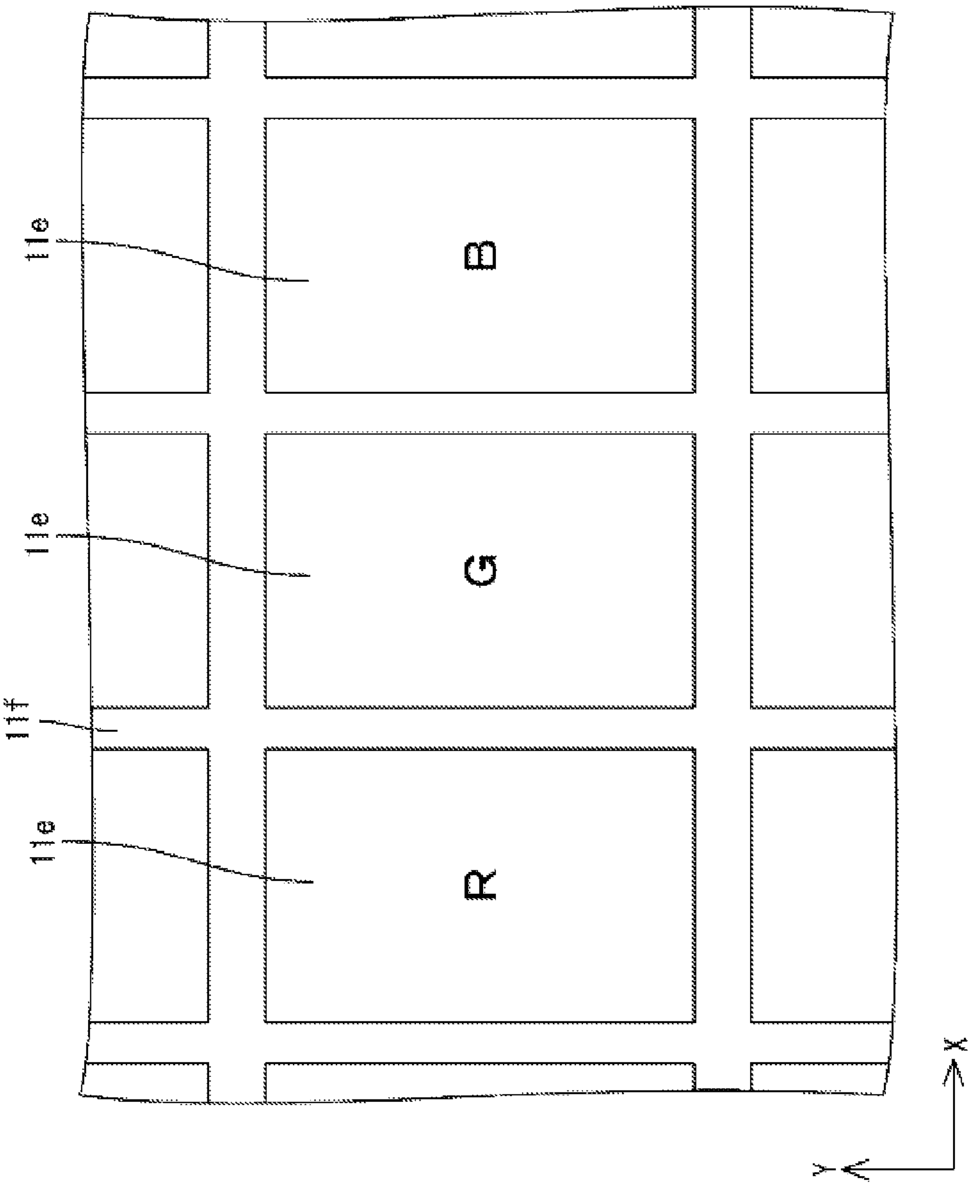
FIG. 5 is a magnified plan view that shows a plan view configuration of a CF substrate.

On the other hand, as shown in FIG. 5, the inner surface of the CF substrate (on the liquid crystal layer side, facing the array substrate) is provided with a plurality of color filters aligned so as to face the respective pixel electrodes 11*b* on the array substrate in a plan view. The color filters are arranged such that the colored parts 11*e* that each display R (red), G (green), or B (blue) are aligned alternately in the X axis direction, and a plurality of groups of these colored parts 11*e*, each group including the three colors (as one pixel unit), are arranged in a matrix along the X axis direction and the Y axis direction. The outer shape of each colored part 11*e* is a rectangle with a long side being the vertical direction in a plan view, following the outer shape of each pixel electrode 11*b*. Between each of the colored parts 11*e* constituting the color filters, a light-shielding part (black matrix) 11*f* is formed in a grid pattern in order to prevent color mixing. The light-shielding part 11*f* is disposed overlapping the gate wiring lines 11*c* and the source wiring lines 11*d* on the array substrate in a plan view. In the liquid crystal panel 11, each R, G, or B colored part 11*e* and each corresponding pixel electrode 11*b* respectively constitute a pixel, and the three R, G, and B pixels constitute one pixel unit, which is a display unit. It is possible to control the rate of light transmittance (brightness, output gradation level) of each pixel based on an image signal supplied to each TFT 11*a* provided in each of the three pixels R, G, or B, thus displaying an image at a prescribed chromaticity in each pixel unit. A plurality of pixel units are arranged in a matrix along the display surface (X axis direction and Y axis direction), and a whole image is constituted of these plurality of pixel units. An opposite electrode (not shown in drawings) facing the pixel electrodes 11*b* on the array substrate is provided on a surface of respective colored parts 11*e* and the light-shielding part 11*f*. The inner surface of each of the substrates is provided with an alignment film (not shown in drawings) for orienting the liquid crystal molecules included in the liquid crystal layer.

As shown in FIG. 2, the backlight device 12 includes a chassis 14 that has a substantially box shape and that has an opening facing the light-emitting surface side (liquid crystal panel 11 side), and a group of optical members 15 disposed so as to cover the opening of the chassis 14. In the chassis 14, LEDs (Light Emitting Diodes) 17, which are light sources, LED substrates 18 on which the LEDs 17 are mounted, a light guide member 19 that guides light from the LEDs 17 to the optical members 15 (liquid crystal panel 11), and a frame 16 that presses the light guide member 19 from the front side are provided. The backlight device 12 is of a so-called edge light-type (side light-type) in which an LED substrate 18 having LEDs 17 is provided on each of the short side edges of the backlight device 12, with the light guide member 19 interposed between the LED substrates 18. Each component of the backlight device 12 will be described in detail below.

The chassis 14 is made of a metal plate such as an aluminum plate or electro-galvanized cold-rolled steel (SECC), for example, and as shown in FIGS. 2 and 3, includes a bottom plate 14*a* that forms a rectangular shape that is long in the horizontal direction in a manner similar to the liquid crystal panel 11, and sides 14*b* that rise from the respective outer edges of the bottom plate 14*a*. In the chassis 14 (bottom plate 14*a*), the long side direction thereof matches the X axis direction (horizontal direction), and the short side direction thereof matches the Y axis direction (vertical direction). The frame 16 and the bezel 13 can be fixed onto the sides 14*b* with screws.

As shown in FIG. 2, the optical members 15 are rectangular with a long side being the horizontal direction in a plan view, as in the liquid crystal panel 11 and the chassis 14. The optical members 15 are disposed between the light guide member 19 and the liquid crystal panel 11 disposed in front of the light guide member 19 (light-emitting side). The optical members 15 include a diffusion plate 15*a* disposed on the rear (light guide member 19 side, opposite to the light-emitting side), and optical sheets 15*b* disposed on the front (liquid crystal panel 11 side, the light-emitting side). The diffusion plate 15*a* has a configuration in which a plurality of diffusion particles are dispersed inside a plate-shaped base material made of an almost completely transparent resin having a prescribed thickness, and has the function of diffusing light that is transmitted through. The optical sheets 15*b* are thinner than the diffusion plate 15*a*, and two optical sheets 15*b* are layered, one on top of the other. Specific types of optical sheets 15*b* include a diffusion sheet, a prism sheet, a microlens sheet, a reflective polarizing sheet, and the like, for example, and it is possible to appropriately choose any of these as optical sheets 15*b*. The optical sheets 15*b* of the present embodiment include a prism sheet, and a configuration thereof will be described. The prism sheet includes a transparent base material that has excellent light-transmitting properties, and a prism layer (optical functioning layer) formed as a layer on the surface of the transparent base material, and the prism sheet can converge transmitted light. The transparent base material of the prism sheet is made of a polyester resin, and more specifically PET (polyethylene terephthalate), for example. The prism layer in the prism sheet is made of a non-halogenated acrylic resin, and includes a plurality of prisms aligned, each having a substantially triangular cross-section. It is preferable that the product "BEF3" manufactured by Sumitomo 3M Limited, for example, be used as the prism sheet.

As shown in FIG. 2, the frame 16 is made of a synthetic resin and formed in a frame shape that extends along the outer edges of the light guide member 19, and can press almost the entire outer edge of the light guide member 19 from the front side. The rear surface of the short sides of the frame 16, or in other words, the portions facing the light guide member 19 and the LED substrates 18 (LEDs 17) are respectively provided with first reflective sheets 20 that reflect light, as shown in FIG. 3. The first reflective sheets 20 have a size that allows it to extend along almost the entire length of the short sides of the frame 16, and face the entire respective groups of LEDs 17 extending in the Y axis direction. The frame 16 can receive the outer edges of the liquid crystal panel 11 from the rear side.

As shown in FIGS. 2 and 3, the LEDs 17 are configured such that LED chips (LED element, light-emitting element) made of an InGaN-type material, for example, are sealed by a resin onto the LED substrates 18. The LED chips mounted on the substrate have a single peak wavelength in a range of 435 nm and 480 nm, or in other words, the blue wavelength region, and emit only blue light. It is more preferable that the main emitting wavelength of the LED chips be in the range of 440 nm to 460 nm, and the wavelength is specifically 451 nm, for example. As a result, blue light with excellent color purity can be emitted as the only color from the LED chips. On the other hand, the resin that seals the LED chips has a fluorescent material dispersed therein, the fluorescent material emitting light of a prescribed color by being excited by the blue light emitted from the LED chip. This combination of the LED chips and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. The LEDs 17 are of a so-called top-type in which the side opposite to that mounted onto the LED substrates 18 is the light-emitting surface.

Figure 6:
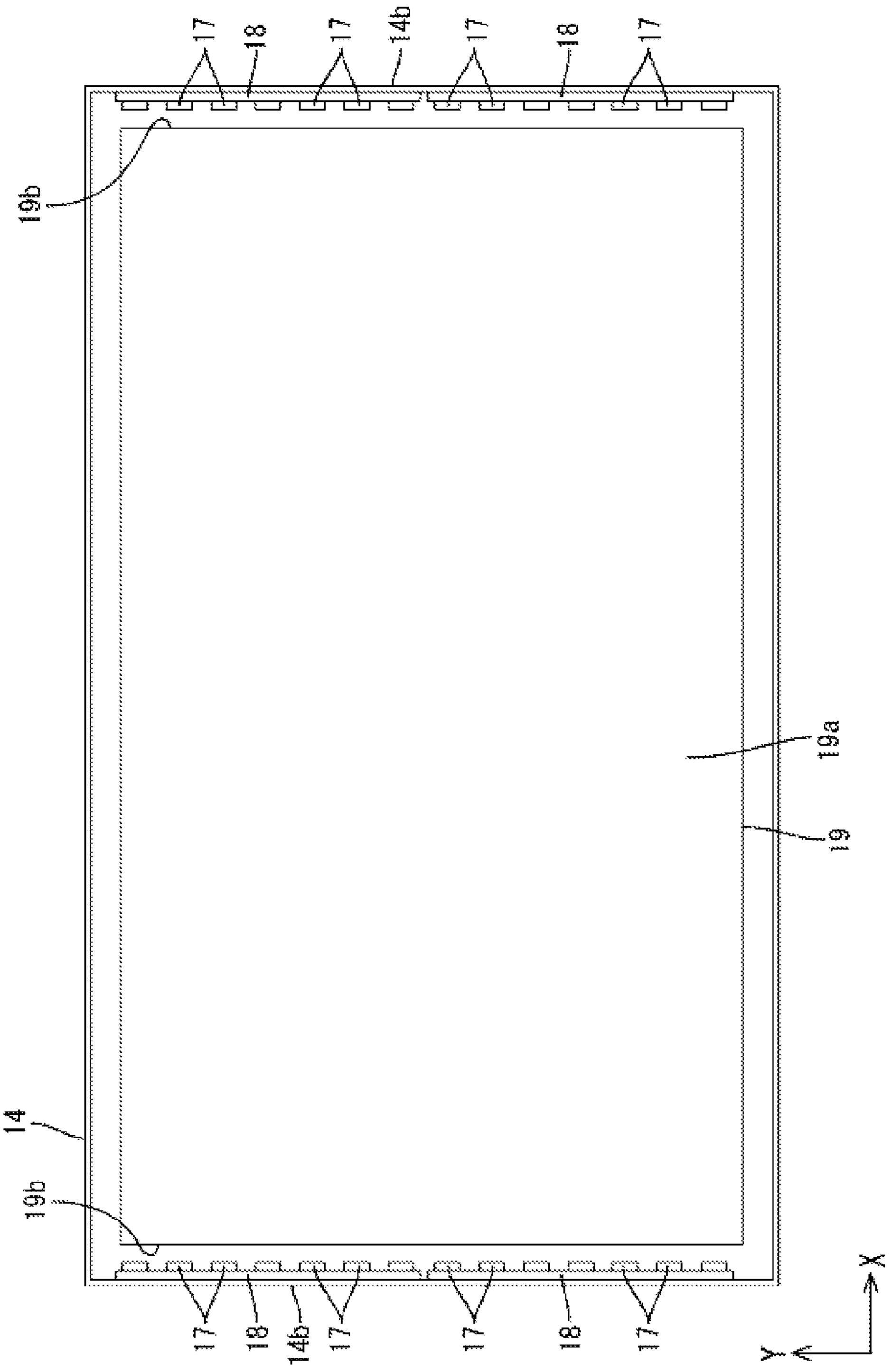
FIG. 6 is a plan view that shows an arrangement of LED substrates and a light guide member in a chassis provided in a backlight device.

The LED substrates 18 are made of a synthetic resin (glass epoxy resin or the like) in which the surface thereof is white with excellent light reflectivity, and as shown in FIGS. 2 and 6, the LED substrates 18 respectively have long and flat shapes that extend along the short side direction of the chassis 14 (edges of the light guide member 19 facing the LEDs 17, the Y direction), and the LED substrates 18 are stored in the chassis 14 such that the main surfaces thereof are disposed along the Y axis direction and the Z axis direction, or in other words, the main surfaces are perpendicular to the planar surfaces of the liquid crystal panel 11 and the light guide member 19 (optical members 15), respectively. In other words, the LED substrates 18 are disposed such that the long side direction of the main surface thereof is the same as the Y axis direction, the short side direction of the main surface thereof is the same as the Z axis direction, and the substrate thickness direction perpendicular to the main surface is the same as the X axis direction. The LED substrates 18 are respectively attached to the inner sides of the pair of sides 14*b*, which are the short sides of the chassis 14, and thus, the light guide member 19 is sandwiched therebetween in the X direction. The two LED substrates 18 are each aligned along the Y axis direction. The inner surfaces of the LED substrates 18 (surfaces facing the light guide member 19) are provided with a plurality of LEDs 17 along the long side direction (Y axis direction) of the LED substrates 18 with gaps therebetween. On the mounting surfaces of the LED substrates 18 for the LEDs 17, wiring patterns (not shown in drawings) made of a metal film (such as copper foil) are formed so as to cut across the group of LEDs 17, which extend along the Y direction, and so as to connect adjacent LEDs 17 to each other in series. With a terminal formed on an edge of these wiring patterns and connected to the LED driver substrate 24 described later, it is possible to supply drive power to each LED 17. The LED substrate 18 can also be made of a metal such as an aluminum-type material, which is the same material used in the chassis 14, for example, with the wiring pattern formed on a surface thereof through an insulating layer.

The light guide member 19 is made of a synthetic resin (such as an acrylic resin, for example) that is almost completely transparent (excellent transparency) and has a refractive index that is sufficiently higher than air. As shown in FIG. 2, the light guide member 19 has a flat rectangular shape that is long in the horizontal direction in a plan view, as in the liquid crystal panel 11 and the chassis 14, and the long side direction of the main surfaces of the light guide member 19 is the same as the X axis direction, the short side direction thereof is the Y axis direction, and the thickness direction that is perpendicular to the main surfaces is the same as the Z axis direction. As shown in FIG. 3, the light guide member 19 is disposed directly below the liquid crystal panel 11 and the optical members 15 in the chassis 14, and is sandwiched in the Y axis direction between the pairs of LED substrates 18, which are on both edges of the long side direction of the chassis 14. Thus, while the LEDs 17 (LED substrates 18) and the light guide member 19 are aligned in the X axis direction, the optical members 15 (liquid crystal panel 11) and the light guide member 19 are aligned in the Z axis direction, and the alignment directions thereof are perpendicular to each other. The light guide member 19 has a function of guiding light emitted from the LEDs 17 traveling in the X axis direction, transmitting the light therein, and outputting the light towards the optical members 15 (Z axis direction).

The light guide member 19 has a substantially flat plate shape that extends along the surfaces of the bottom plate 14*a* of the chassis 14 and the optical members 15, and the main surfaces of the light guide member 19 are defined by the X axis direction and the Y axis direction. Of the main surfaces of the light guide member 19, the surface thereof that faces the front side outputs light from the inside of the light guide member 19 towards the optical members 15 and the liquid crystal panel 11, and is a light output surface 19*a*. Of the outer edges of the light guide member 19 adjacent to each other around the main surfaces, the two short side faces that extend along the Y axis direction respectively face the LEDs 17 (LED substrates 18) with prescribed gaps therebetween, and these are the light-receiving surfaces 19*b* at which light from the LEDs 17 is received. On the front side of each space between the LEDs 17 and the light-receiving surface 19*b*, as shown in FIG. 3, the above-mentioned first reflective sheet 20 is disposed, and on the rear side of the same space, a second reflective sheet 21 is disposed so as to sandwich the same space between the first reflective sheet 20 and the second reflective sheet 21. The reflective sheets 20 and 21 also sandwich the edges of the light guide member 19 on the LED 17 side and the LEDs 17, in addition to the above-mentioned space. Thus, the reflective sheets 20 and 21 repeatedly reflect light from the LEDs 17, thus allowing light to enter the light-receiving surfaces 19*b* efficiently. The light-receiving surfaces 19*b* are on a plane parallel to that defined by the Y axis and the Z axis, and are substantially perpendicular to the light output surface 19*a*. The direction at which the LEDs 17 and the light-receiving surfaces 19*b* are aligned with respect to each other is the same as the X axis direction, and is parallel to the light output surface 19*a*. A diffusion reflective sheet that uses a foam resin, or a mirrored reflective sheet in which a metal thin film or a dielectric multilayer film is formed on a surface by vapor deposition is a suitable material for the first reflective sheets 20 and the second reflective sheets 21.

A surface 19*c* on the side opposite to the light output surface 19*a* of the light guide member 19 is provided on the entire surface thereof with a light guide reflective sheet 22 that can reflect light in the light guide member 19 towards the front side. In other words, the light guide reflective sheet 22 is interposed between the bottom plate 14*a* of the chassis 14 and the light guide member 19. At least one of the light output surface 19*a* and the surface 19*c* on the side opposite thereof of the light guide member 19 is patterned so as to have a reflective part (not shown in drawings) that reflects interior light or a scattering part (not shown in drawings) that scatters interior light, at a prescribed in-plane distribution, thus controlling the distribution of light outputted from the light output surface 19*a* so as to be even along the entire surface.

Figure 7:
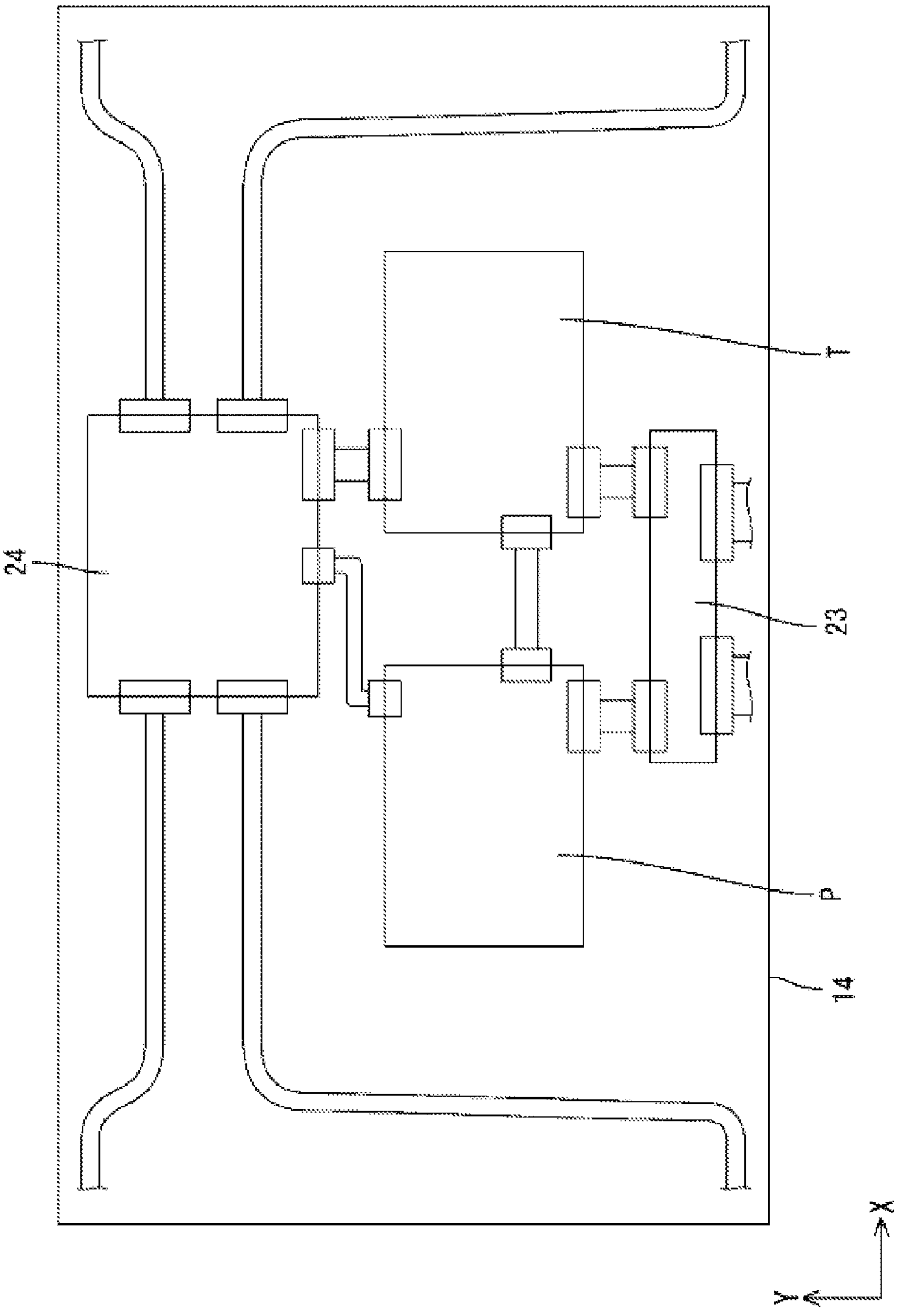
FIG. 7 is a bottom surface view that shows an arrangement of a power source substrate, a tuner substrate, a TCON substrate, and an LED driver substrate in the chassis.
Figure 8:
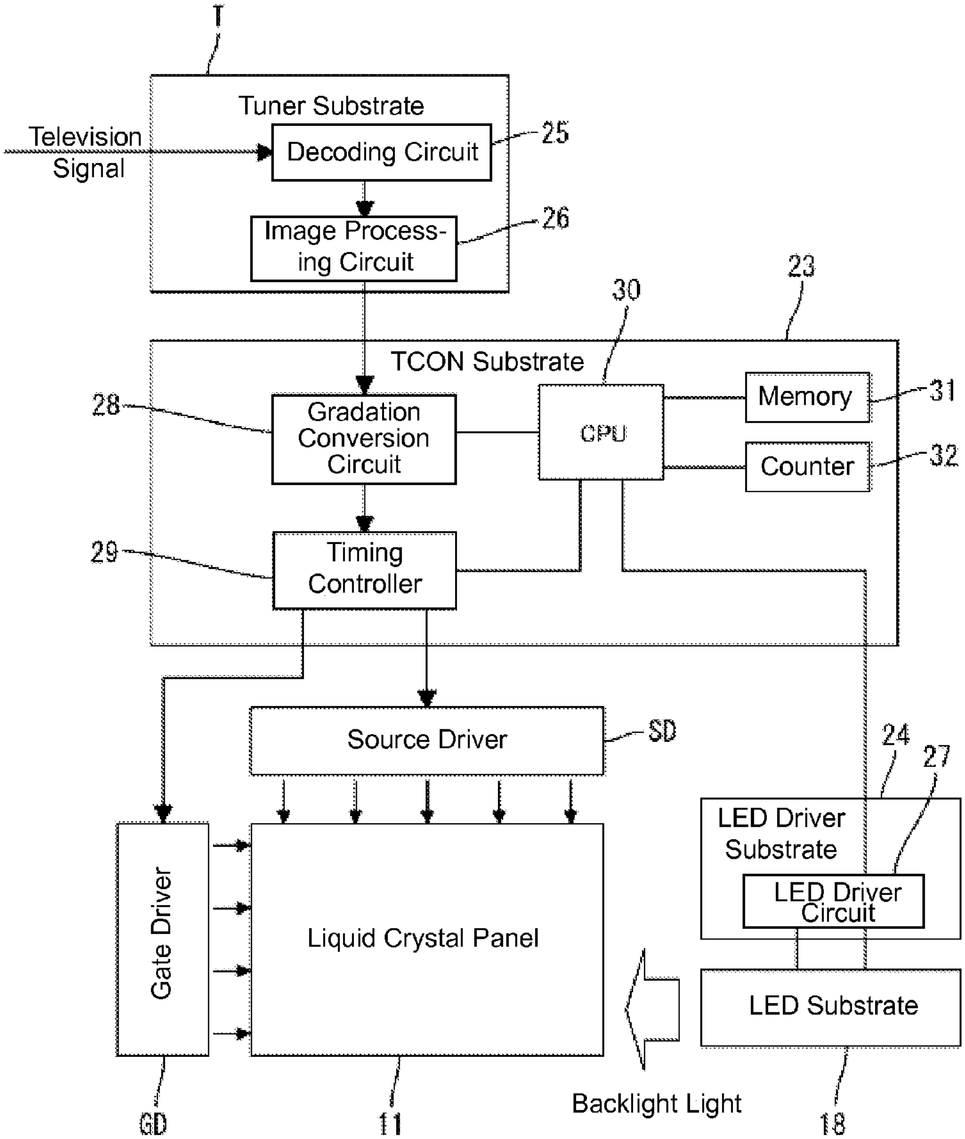
FIG. 8 is a block diagram that shows relations between each component involved in image display.

As shown in FIG. 7, the liquid crystal display device 10 with such a configuration includes a TCON substrate (control substrate) 23 that controls the driving of the liquid crystal panel 11 and the like, and an LED driver substrate (light source driver substrate) 24 that drives the LEDs 17. The TCON substrate 23 and the LED driver substrate 24 are provided on the rear side of the chassis 14 along with the above-mentioned power source substrate P and the tuner substrate T. Of these, the power source substrate P can supply electricity respectively to the tuner substrate T, the TCON substrate 23, and the LED driver substrate 24 by being connected therewith via wiring lines. The tuner substrate T is connected to the TCON substrate 23 and the LED substrate 24 via wiring lines, respectively. As shown in FIG. 8, the tuner substrate T includes a decoding circuit 25 that decodes received television signals, and an image processing circuit 26 that generates an image signal by conducting image processing on the decoded signal outputted by the decoding circuit 25, and outputs the image signal to the TCON substrate 23. The image signal is constituted of an R image signal, a G image signal, and a B image signal for driving each TFT 11*a* corresponding to each of the R, G, and B pixels (the colored parts 11*e*) that constitute one pixel unit of the liquid crystal panel 11, and each of the R, G, and B image signals has a prescribed input gradation level. The LED driver substrate 24 is connected to each LED substrate 18 and the TCON substrate 23 via respective wiring lines. The LED driver substrate 24 has an LED driver circuit 27 that supplies drive power to the LEDs 17 on the LED substrates 18. The LED driver substrate 24 can be formed integrally with the power source substrate P.

The TCON substrate 23 includes a gradation conversion circuit (gradation conversion part) 28, a timing controller 29, a CPU (central processing unit) 30, a memory 31, and a counter (usage amount calculator) 32. Of these, the gradation conversion circuit 28 has the function of converting the input gradation level of the image signals of each of the colors R, G, and B outputted from the image processing circuit 26 of the tuner substrate T to a converted gradation level based on a γ value preset for each color, and outputting converted signals of each color R, G, and B based on the converted gradation level to the timing controller 29, based on commands from the CPU 30. The γ value of each color R, G, and B is stored in the memory 31, for example. The timing controller 29 has the function of supplying the converted signals from the gradation conversion circuit 28 to the source driver SD and the gate driver GD at a prescribed timing based on commands from the CPU 30.

Figure 9:
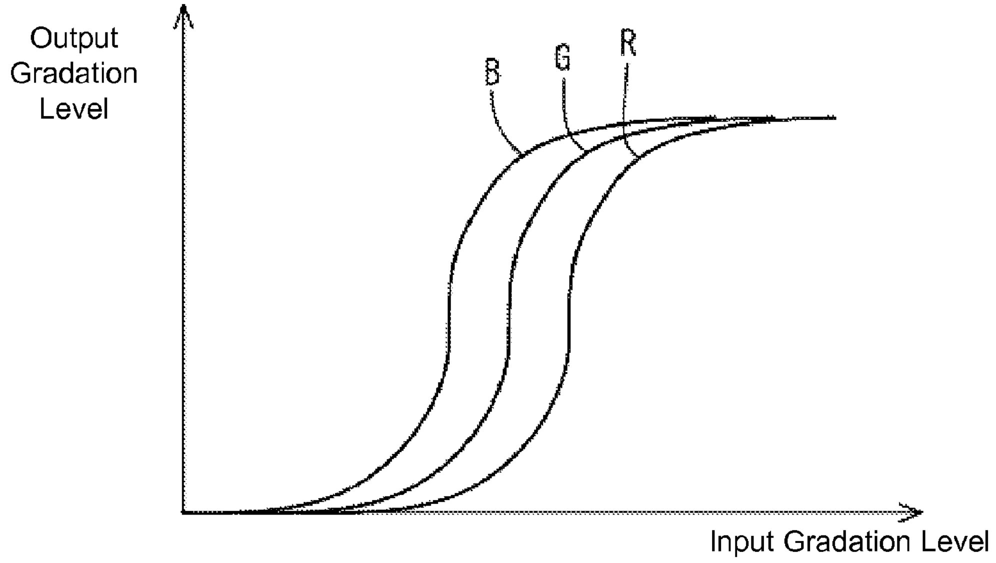
FIG. 9 is a graph that shows relations of the output gradation level in the liquid crystal panel to the input gradation level of the image signal of each color R, G, and B.
Figure 10:
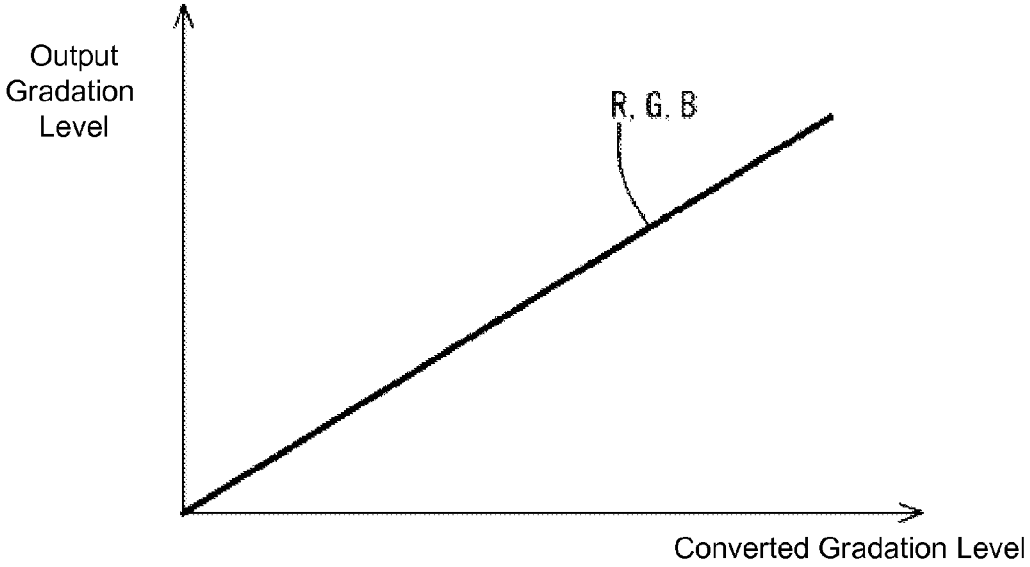
FIG. 10 is a graph that shows a relation of the output gradation level in the liquid crystal panel to the converted gradation level obtained by converting the input gradation level of the image signal of each color R, G, and B, based on the γ values.

The CPU 30 can adjust (change, update) the γ value of each color stored in the memory 31, and functions as a "chromaticity adjusting part". Specifically, as shown in FIG. 9, the transmittance of the respective colored parts 11*e* of the color filters in the liquid crystal panel 11, or in other words, the brightness (output gradation level) in relation to the input gradation level of image signals of the respective colors R, G, and B, is non-linear for each color and differs for each color. Thus, if the input gradation level of the image signals of each color is inputted, as is, to the liquid crystal panel 11 to drive each TFT 11*a*, then the RGB color balance (white balance) in each pixel unit constituted of the pixels of the respective colors breaks down, which means that it is not possible to display an image with the correct grayscale. The above-mentioned ratios of the output gradation levels to the input gradation levels of the image signals, or in other words, the γ values have individual differences between manufactured liquid crystal display devices 10. Thus, in the present embodiment, in the manufacturing process of the liquid crystal display device 10, the CPU 30 adjusts the γ value of each color R, G, and B stored in the memory 31, and as a result, as shown in FIG. 10, with the γ values, the input gradation level of the image signal of each color can be converted to a converted gradation level that is linear in relation to the output gradation level. As a result of the γ value of each color being optimized, the input gradation level of the image signal of each color is converted to a converted gradation level that is linear in relation to the output gradation level by the gradation conversion circuit 28, and a converted signal based on the converted gradation level is outputted to the timing controller 29, and thus, the white balance of the pixel units (image) in the liquid crystal panel 11 becomes optimal. The adjustment of the γ value (white balance adjustment, chromaticity adjustment) is conducted by displaying a test image based on a prescribed test image signal in the liquid crystal panel 11 and measuring the chromaticity of the test image using a chromaticity measuring device, for example. This is conducted once or a plurality of times in the manufacturing process of the liquid crystal display device 10, and is sometimes conducted during repair, maintenance, or the like of the liquid crystal display device 10 after being shipped as a product.

Figure 11:
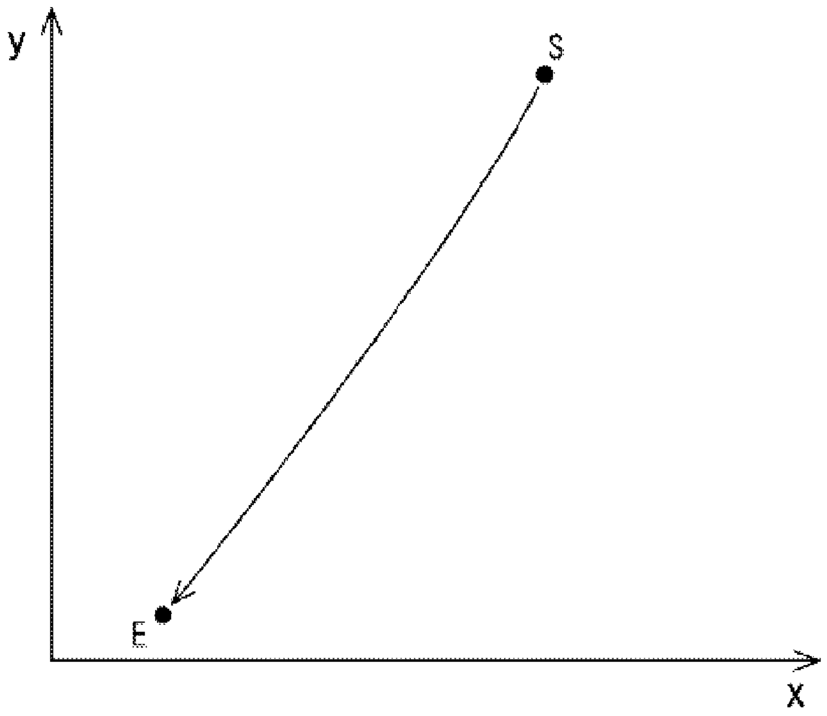
FIG. 11 is a CIE 1931 chromaticity diagram that shows a chromaticity shift of an image that occurs due to the usage of the LEDs.
Figure 12:
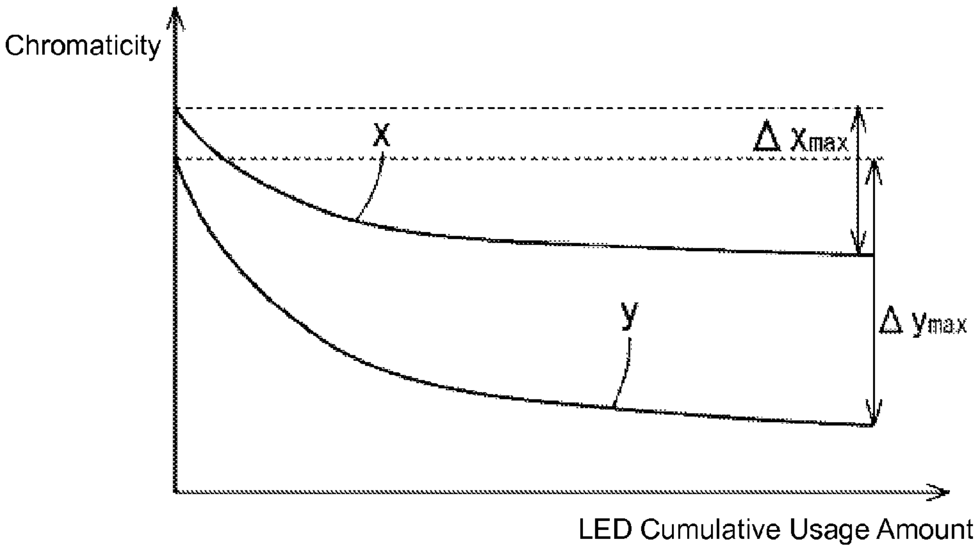
FIG. 12 is a graph that shows a relation of the chromaticity to the cumulative usage amount of the LEDs.

The optical members 15 and the light guide member 19, which are interposed between the liquid crystal panel 11 and the LEDs 17 of the liquid crystal display device 10 and apply prescribed optical effects on light from the LEDs 17 and output the light to the liquid crystal panel 11, can undergo changes in optical properties over time by receiving light from the LEDs 17, depending on the material of the optical members 15 and the light guide member 19. Specifically, the LEDs 17 provided in the backlight device 12 have the blue wavelength region as the main light-emitting region as mentioned above, and emit light in the blue wavelength region at the highest intensity. On the other hand, the prism sheet, which is a type of optical sheet 15*b* included among the optical members 15, has a transparent base material made of a polyester resin, and more specifically, PET. Thus, when the prism sheet receives the above-mentioned light in the blue wavelength region (particularly light of a wavelength close to 450 nm), as shown in FIG. 11, the x value and the y value of the chromaticity of the transmitted light are reduced, and the chromaticity shifts towards blue along the arrowed line in FIG. 11 from the starting point S to the ending point E. This chromaticity shift progresses irreversibly based on a cumulative usage amount such as the illumination time, illumination amount, and the consumed electrical energy of the LEDs 17, and the x value and the y value stop changing when they reach a prescribed value (end point of the arrowed line shown in FIG. 11). FIG. 11 is a CIE (Commission Internationale de l'Eclairage) 1931 chromaticity diagram, and the chromaticity in the diagram is the chromaticity when the entire liquid crystal panel 11 displays white. The x value and the y value in FIG. 11 are chromaticity coordinates, and the arrowed line in the diagram indicates the direction of chromaticity shift that progresses based on the cumulative usage amount of the LEDs 17. As shown in FIG. 12, the above-mentioned chromaticity shift of the image progresses rapidly when the LEDs 17 are initially lit, and gradually slows down until the chromaticity becomes constant. The maximum value Δxmax of the amount of change Δx of the x value of the chromaticity of the image is 0.015, for example, and the maximum value Δymax of the amount of change Δy of the y value is 0.030, for example. The amounts of change Δx and Δy can change based on the configuration of the optical sheets 15*b* and other members. If a plurality of optical sheets 15*b* made of PET are used, for example, then the amounts of change Δx and Δy become greater than when only one optical sheet 15*b* made of PET is used. The cause of chromaticity shift is not clear at this point, but possible causes include the PET material itself, for example, and impurities or additives included in the optical sheets 15*b* made of PET.

Figure 13:
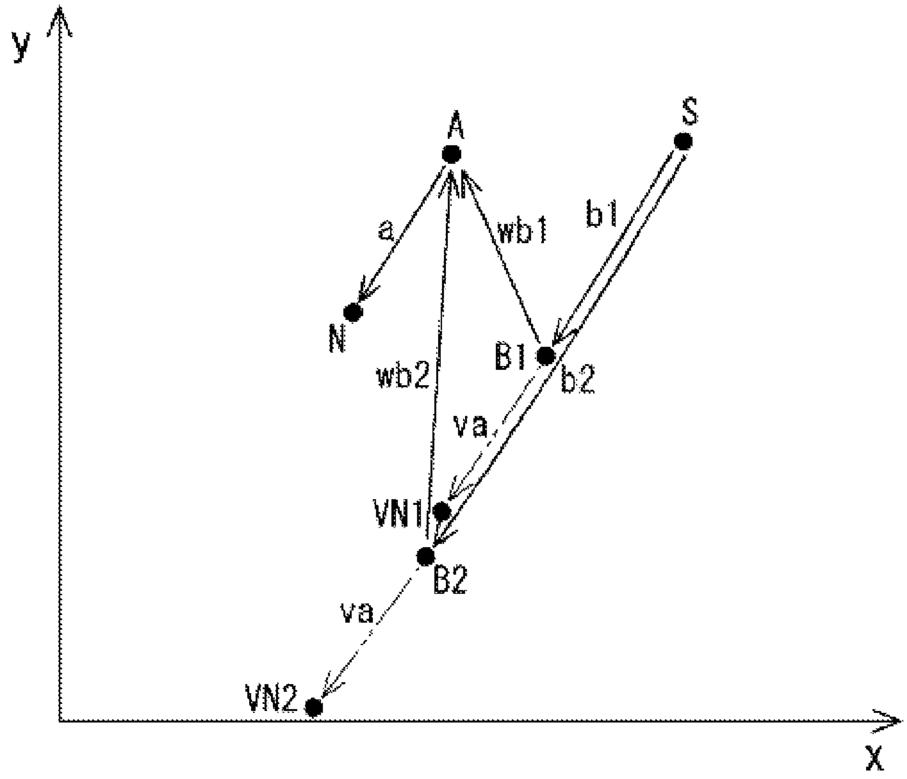
FIG. 13 is a CIE 1931 chromaticity diagram that shows a chromaticity shift in the image due to the usage of the LED after white balance adjustment has been conducted.

As a countermeasure, in the liquid crystal display device 10 of the present embodiment, white balance adjustment is conducted as appropriate during the manufacturing process as stated above, but during the period until the white balance adjustment is conducted, the LEDs 17 in the backlight device 12 are lit for lighting tests during the manufacturing process, and thus, chromaticity shift resulting from the optical members 15 occurs to a certain extent during this period (along the arrowed line "b1" from the starting point S to the point B1 in FIG. 13). When white balance adjustment is conducted, as shown in FIG. 13, the chromaticity of the image is manually shifted from the point B1, which is a point before white balance adjustment, to the post-adjustment point A along the arrowed line "wb1," and as a result, the chromaticity changes to a value off of the above-mentioned chromaticity shift trajectory caused by the optical member 15 (a value that is not continuous with the chromaticity shift trajectory). Thereafter, the chromaticity of the image shifts from the point A to the present point N along the arrowed line "a" that runs parallel to the chromaticity shift trajectory resulting from the optical members 15. The "chromaticity shift trajectory" in general refers to the arrowed line that starts from the starting point S and ends at the ending point E shown in FIG. 11, and in FIG. 13, refers to the arrowed lines "b1" and "va" that start from the starting point S, pass through the point B1, and reach the hypothetical point VN1, where VN1 is designated as a hypothetical present point for a case in which white balance adjustment is not conducted.

Also, the timing at which the white balance adjustment is conducted during the manufacturing process differs for each manufactured liquid crystal display device 10, and there is a possibility of individual differences between the cumulative usage times (illumination time or the like) of the LEDs 17 up to when white balance adjustment is conducted due to differences in timing. In other words, there are individual differences in changes in chromaticity in the image occurring up to the point at which white balance adjustment is conducted. Specifically, in FIG. 13, the points before white balance adjustment is conducted include B2 in addition to B1, and the arrowed lines from the starting point S include "b2", which differs in length from "b1" (usage amount of LEDs 17, amount of change in chromaticity).

Figure 14:
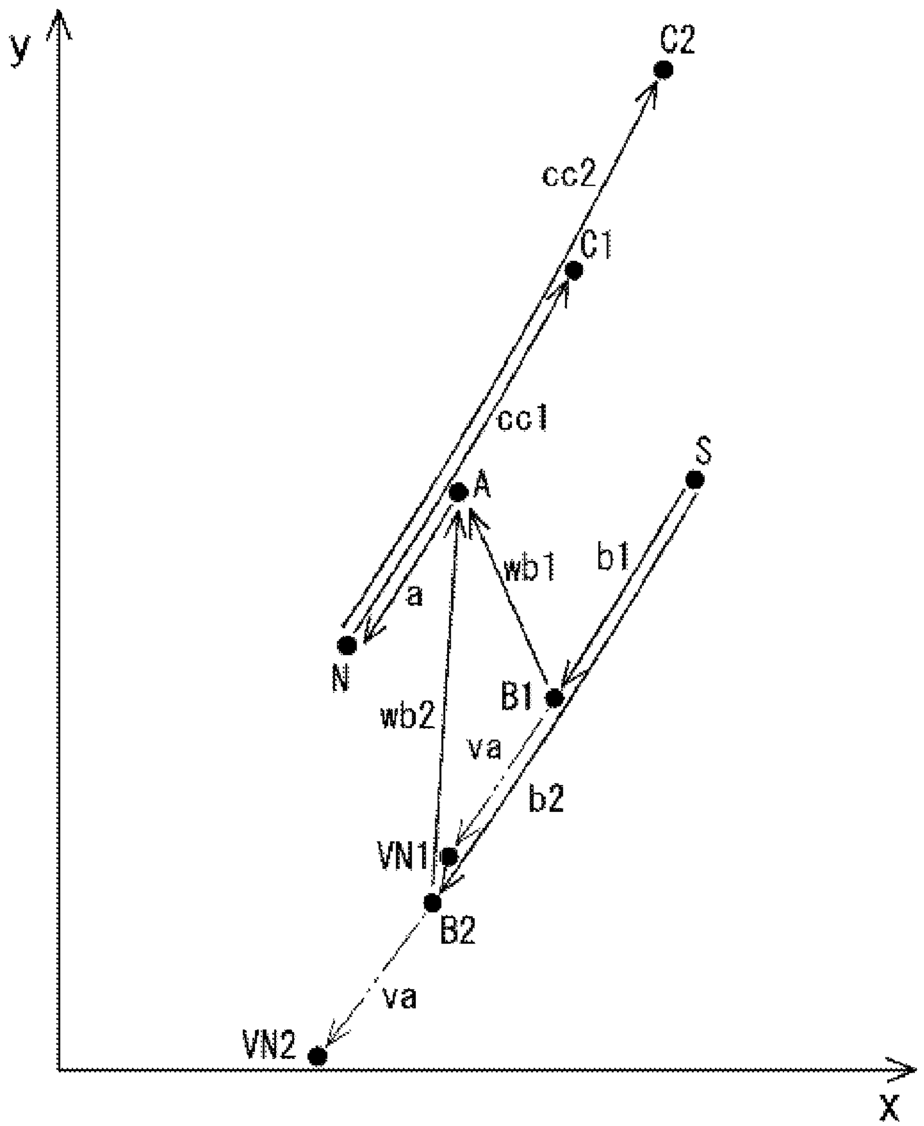
FIG. 14 is a CIE 1931 chromaticity diagram that shows a change in chromaticity when the chromaticity of the image is modified by a conventional modification method.

Thus, if the chromaticity shift of the images resulting from changes in optical properties in the optical members 15 needs to be corrected, then if the chromaticity is simply modified based on the cumulative usage amount (illumination time and the like) of the LEDs 17 from initial start of illumination to the present, as done conventionally, then there is a possibility of the following problem occurring. If such chromaticity modification is conducted after white balance adjustment, then as shown in FIG. 14, the modification amount (length of the arrowed line "cc1") becomes excessive, and thus, the point C1 after modification does not correspond to the point A, i.e., cannot return to the chromaticity at the point in time when white balance adjustment was conducted. In addition, due to individual differences in the timing at which white balance adjustment is conducted, variation in the adjusted amount of the chromaticity occurs. Specifically, the lengths of the arrowed line "cc1" and "cc2" differ, and thus, the post-modification points C1 and C2 differ. In other words, there was a problem that the post-modification chromaticity value varied due to individual differences in timing at which white balance adjustment was conducted.

Figures 15, 16:
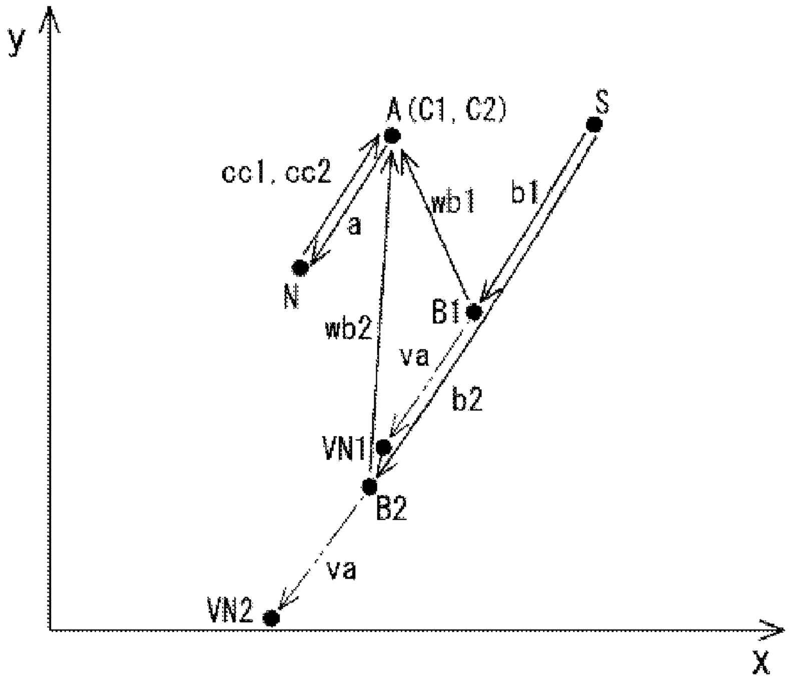
FIG. 15 is a table that shows a correction data table stored in a memory in advance.
FIG. 16 is a CIE 1931 chromaticity diagram that shows a change in chromaticity when the chromaticity of the image is modified based on the correction data table, a first cumulative illumination time, and a second cumulative illumination time.
Figure 17:
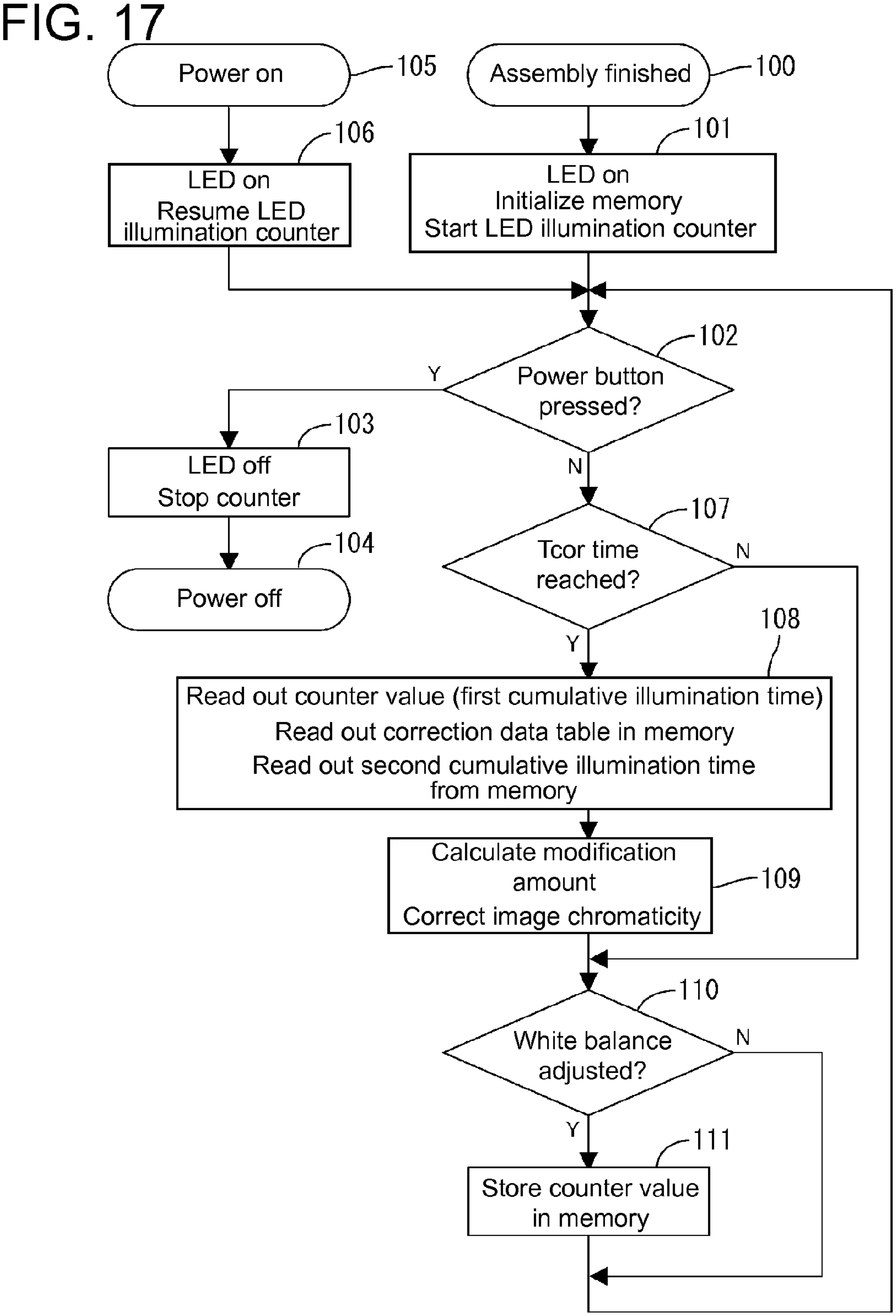
FIG. 17 is a flow chart that shows steps to be conducted when modifying the chromaticity of the image based on the correction data table, the first cumulative illumination time, and the second cumulative illumination time.

In the present embodiment, the CPU 30, the memory 31, and the counter 32 provided in the TCON substrate 23 always modify the chromaticity to the chromaticity value attained by white balance adjustment regardless of the timing at which white balance adjustment was conducted. Next, specific methods for modifying the chromaticity will be described. First, the memory 31 in FIG. 8 stores in advance data of the above-mentioned chromaticity shift occurring due to the optical members 15, or in other words, data relating to the amount of change in chromaticity of an image in relation to the cumulative illumination time, which is a usage amount of the LEDs 17, and specifically, the correction data table shown in FIG. 15 is stored as the above-mentioned data. The correction data table shown in FIG. 15 indicates the relation between the cumulative illumination time of the LEDs 17 and the Δx and Δy, which are the amounts of change in the x value and the y value of the chromaticity of the image, and specifically indicates the Δx and Δy at 5 hour intervals of the above-mentioned cumulative illumination time. In the present embodiment, if the cumulative illumination time of the LEDs 17 exceeds 200 hours, the maximum value of Δx becomes a constant value of 0.015, and the maximum value of Δy becomes a constant value of 0.030. The data in the correction data table shown in FIG. 15 matches with the graph of FIG. 11. As stated above, in the memory 31, the γ values for the respective colors R, G, and B are stored in an address different from the correction data table.

As shown in FIG. 8, the counter 32 measures the cumulative "illumination time (h)" as the usage amount of the LEDs 17 via the CPU 30 and the LED driver circuit 27. Specifically, the counter 32 starts measuring the illumination time when the LEDs 17 are turned on, and stops measuring the illumination time when the LEDs 17 are turned off, and temporarily stores this count at the time when measurement is stopped to a non-volatile storage medium such as flash memory. When the LEDs 17 are next turned on, the counter 32 starts measuring the illumination time with the stored count being the starting value, which allows the cumulative illumination time of the LEDs 17 to be measured. When measuring the cumulative illumination time of the LEDs 17 with the counter 32, the memory 31 may store the temporary count when the LEDs 17 are turned off.

In addition to the correction data table shown in FIG. 15 and the γ values, the count measured by the counter 32 representing the cumulative illumination time of the LEDs 17 when white balance adjustment was conducted is stored in the above-mentioned memory 31. Specifically, when white balance—i.e., the γ values of the respective colors R, G, and B—is adjusted the CPU 30 samples the count measured by the counter 32 at that time as a second cumulative illumination time (second cumulative usage amount), and stores the second cumulative illumination time to an address in the memory 31 different from where the correction data table and the γ values are stored. In other words, the CPU 30 can function as a "second cumulative usage amount sampler".

When modifying chromaticity shift in the image resulting from the change in optical properties in the optical members 15, the CPU 30 modifies the image signal for each color based on a first cumulative illumination time (first cumulative usage amount), which is a present cumulative illumination time of the LEDs 17, and the correction data table and the second cumulative illumination time stored in the memory 31. Specifically, when chromaticity modification is about to be conducted, the CPU 30 obtains the first cumulative illumination time as the count measured by the counter 32, and compares the first cumulative illumination time with the correction data table stored in the memory 31, thus determining the Δx and Δy corresponding to the first cumulative illumination time as the first change amounts of the chromaticity of the image. The first change amounts are the absolute values of the value obtained by subtracting the x value of the chromaticity at the starting point S from the x value of the chromaticity of the point VN1 (VN2) shown in FIG. 16, and the value obtained by subtracting the y value of the starting point S from the y value of the chromaticity of the point VN1 (VN2), respectively, and are referred to here as "Δx1 and Δy1". The CPU 30 also compares the second cumulative illumination time stored in the memory 31 with the correction data table, thus determining the Δx and Δy corresponding to the second cumulative illumination time as the second change amounts of the chromaticity of the image. The second change amounts are the absolute values of the value obtained by subtracting the x value of the chromaticity at the starting point S from the x value of the chromaticity of the point B1 (B2) shown in FIG. 16, and the value obtained by subtracting the y value of the starting point S from the y value of the chromaticity of the point B1 (B2), respectively, and are referred to here as "Δx2 and Δy2".

By subtracting the second change amounts from the first change amounts determined as mentioned above, the CPU 30 obtains the x value and the y value to which a chromaticity is to be modified, and modifies the image signal based on the x value and the y value to which the chromaticity is to be modified. Specifically, the x value to which the chromaticity is to be modified is determined by "Δx1–Δx2", while the y value to which the chromaticity is to be modified is determined by "Δy1–Δy2". Specifically, if the first cumulative illumination time is 20 hours and the second cumulative illumination time is 10 hours, for example, then as shown in FIG. 15, as for the first change amount, "Δx1" is "0.008" and "Δy1" is "0.017", and as for the second change amount, "Δx2" is "0.006" and "Δy2" is "0.012". Thus, the x value to which the chromaticity is to be modified is "0.008–0.006=0.002", and the y value thereof is "0.017–0.012=0.005".

The x value and the y value to which the chromaticity is to be modified are respectively the absolute value of the value obtained by subtracting the x value of the chromaticity of the point B1 (B2) from the x value of the chromaticity of the point VN1 (VN2) in FIG. 16, and the absolute value of the value obtained by subtracting the y value of the point B1 (B2) from the y value of the chromaticity of the point VN1 (VN2). These values are respectively equal to the absolute value of the value obtained by subtracting the x value of the chromaticity at the point A attained by white balance adjustment was conducted from the x value of the chromaticity at the present point N of FIG. 16, and the absolute value of the value obtained by subtracting the y value of the chromaticity at the point A from the y value of the chromaticity at the present point N. If the image signal is modified in this manner, then as shown in FIG. 16, the modification value, or in other words, the length of the arrowed line "cc1" (cc2) is equal to the amount of change in chromaticity from when white balance adjustment was conducted to the present, or in other words, the length of the arrowed line "a." In addition, the point C1 (C2), which is the chromaticity after modification, matches with the point A, which is the chromaticity attained by white balance adjustment. Thus, it is possible to restore the chromaticity to the point attained by white balance adjustment by modifying the chromaticity of the image. As shown in FIG. 8, the CPU 30 and the gradation conversion circuit 28 work together to modify the input gradation level of the image signal for each color R, G, B based on the x value and the y value to which the chromaticity is to be modified, thereby obtaining the modified gradation level for each color, and then perform a further conversion of the modified gradation level based on the γ value to obtain the converted gradation level, and the converted signals created based on the converted gradation level are outputted to the timing controller 29. Thus, an image with a modified chromaticity is displayed in the liquid crystal panel 11 based on the converted signal.

The following effects can be attained with the above-mentioned modification method. If individual differences in timing of white balance adjustment occur, the chromaticity prior to white balance adjustment varies as in the points B1 and B2 in FIG. 16, and the amount of change in chromaticity up to when white balance adjustment is conducted also varies as in the lengths of the arrowed lines "b1" and "b2". Even in such cases, in the present embodiment, when determining a value to which the chromaticity is to be modified, by subtracting the second change amounts of the chromaticity at the second cumulative illumination time, which is the cumulative illumination time of the LEDs 17 up to when white balance adjustment is conducted, from the first change amounts in chromaticity at the first cumulative illumination time, which is the cumulative illumination time of the LEDs 17 at present, the value to which the chromaticity is to be modified becomes the same value regardless of variation in the second cumulative illumination time (lengths of arrowed lines "b1" and "b2" in FIG. 16). In other words, according to the present embodiment, the value to which the chromaticity is to be modified becomes the same value that is based only on the relation between the chromaticity attained by white balance adjustment (point A) and the present chromaticity (N). As a result, it is possible to prevent variation in the modified chromaticity of an image, thus attaining an excellent display quality.

Furthermore, in the present embodiment, the chromaticity modification mentioned above is conducted periodically, thus always maintaining the chromaticity of the image at the same value as when white balance adjustment was conducted. Specific steps for chromaticity modification will be described with reference to the flowchart of FIG. 17. When assembly of the liquid crystal display device 10 is finished (step 100), and illumination of the LEDs 17 provided in the backlight device 12 is started, the value of the second cumulative illumination time in the memory 31 is initialized, and measurement of the illumination time by the counter 32 is started (step 101). Next, whether or not the power button of the liquid crystal display device 10 has been pressed is determined (step 102), and if the answer is "YES", then the LEDs 17 are turned off and the measurement of the illumination time by the counter 32 is stopped (step 103), and after the count is stored in a flash memory of the like, the power is turned off (step 104). On the other hand, if the power is turned on again (step 105), then the LEDs 17 are turned on and the measurement of the illumination time by the counter 32 is resumed from the stored measurement value (step 106). In step 102, if the answer is "NO" (if the power continues to be on), then it is determined whether or not the LEDs 17 have exceeded a prescribed illumination time Tcor (step 107), and if the answer is "YES", then the count of the counter 32 at that point in time is read out as the first cumulative illumination time, and the correction data table and the second cumulative illumination time stored in the memory 31 are read out (step 108). Next, the value to which the chromaticity is to be modified is calculated by the above-mentioned method based on the data that was read out, and the image signal is modified based on the value to which the chromaticity is to be modified, which was obtained by the aforementioned calculation (step 109). In steps 108 and 109, if white balance adjustment has not yet been conducted, then a calculation and the like are performed by setting the second cumulative illumination time to "0". After step 109 is finished or if the answer to step 107 was "NO", it is determined whether or not white balance adjustment has been conducted (step 110), and if the answer is "YES", the count from the counter 32 at that point in time is stored in the memory 31 as the second cumulative illumination time (step 111). In step 111, if the second cumulative illumination time is already stored in the memory 31, then this data is overwritten (updated). As a result, if white balance adjustment is conducted a plurality of times, it is possible to store in the memory 31 the count of the counter when the white balance adjustment was last conducted as the second cumulative illumination time. After finishing step 111, or if the answer to step 110 is "NO", then step 102 is started again. By executing the flowchart, it is possible to conduct chromaticity modification periodically every time the prescribed period of time Tcor passes, and thus, it is possible to always maintain the chromaticity of the image at the same chromaticity as when the white balance adjustment was conducted (point A in FIG. 16).

As described above, the liquid crystal display device (display device 10) of the present embodiment includes: a liquid crystal panel (image display part) 11 that has a plurality of pixels and that displays an image based on an image signal; a CPU 30 that functions as a chromaticity adjusting part that adjusts a chromaticity of the pixels; an LED (light source) 17 that supplies light to the liquid crystal panel 11; a counter (usage amount measuring part) 32 that measures the cumulative usage amount of the LED 17; a memory 31 that stores in advance data (correction data table) relating to the amount of change in chromaticity of an image in relation to the cumulative usage amount of the LED 17; and a CPU 30 that functions as a correction processing part that conducts a process that modifies the image signal based on the data stored in the memory 31 and on the cumulative usage amount of the LED 17 measured by the counter 32. The CPU 30 that functions as a correction processing part determines a first change amount in chromaticity of the image from the data stored in the memory 31, based on a first cumulative usage amount that is a cumulative usage amount of the LED 17 up to the present measured by the counter 32, the CPU 30 determines a second change amount in chromaticity of the image from the data stored in the memory 31, based on a second cumulative usage amount that is a cumulative usage amount of the LED 17 up to when the chromaticity of the pixels is adjusted by the CPU 30 that functions as the chromaticity adjusting part in which the counter 32 conducts measurement, and the CPU 30 obtains the value to which the chromaticity is to be modified by subtracting the second change amount from the first change amount and modifies the image signal based on the value to which the chromaticity is to be modified.

The chromaticity of the image displayed in the liquid crystal panel 11 can change based on the cumulative usage amount of the LEDs 17. As a countermeasure, in the manufacturing process and the like of the liquid crystal display device 10, for example, the chromaticity is adjusted for the respective pixels constituting an image by the CPU 30 that functions as the chromaticity adjusting part. As the chromaticity of each pixel is adjusted, the chromaticity of the image constituted of the respective pixels can change to a value that is not continuous to the change in chromaticity occurring due to the usage of the LEDs 17. Furthermore, variation can occur in the cumulative usage amount of the LED 17 up to when chromaticity adjustment is conducted for each pixel, and thus, in addition to the variation that occurs in the cumulative usage amount of the LEDs 17 up to when chromaticity adjustment is conducted for each pixel, variation also occurs in the amount of change in the chromaticity of the image due to the usage of the LEDs 17. Thus, if the chromaticity of the image is simply modified based on only the cumulative usage amount of the LEDs 17 up to the present, then the modified chromaticity of the image becomes different from the chromaticity at the point when adjustment takes place, and the value of the modified chromaticity varies depending on the cumulative usage amount of the LEDs 17 up to when the chromaticity adjustment for each pixels takes place, and thus, the chromaticity may become a non-ideal value.

In the present embodiment, the counter 32 measures the cumulative usage amount of the LEDs 17, and the CPU 30 that functions as the correction processing part modifies the image signal based on data stored in the memory 31 in advance and the cumulative usage amount of the LEDs 17 measured by the counter 32. Specifically, the CPU 30 that functions as a correction processing part determines the first change amount of the chromaticity of the image from the data stored in the memory 31 based on the first cumulative usage amount, which is a cumulative usage amount of the LEDs 17 measured by the counter 32 up to the present, and determines the second change amount of the chromaticity of the image from the data stored in the memory 31 based on the second cumulative usage amount measured by the counter 32, which is the cumulative usage amount of the LEDs 17 up to when the chromaticity of the pixels is adjusted. The CPU 30 that functions as the correction processing part subtracts the second change amounts from the first change amounts and obtains the value to which the chromaticity is to be modified, and modifies the image signal based on the value to which the chromaticity is to be modified. Thus, the chromaticity of the image can be reverted to the value at the time when the chromaticity of each pixel was adjusted, thus allowing the chromaticity of the image to be adjusted to an ideal value. Furthermore, the chromaticity of the image after being modified by the CPU 30 that functions as a correction processing part becomes the value thereof at the time when the chromaticity of each pixel was adjusted regardless of variation in the cumulative usage amount of the LEDs 17 up to when the chromaticity of each pixel is adjusted, and thus, it is also possible to prevent variation in the modified chromaticity of the image. Thus, it is possible to attain an excellent display quality.

The counter 32 measures the cumulative illumination time of the LEDs 17 as the usage amount. With this configuration, compared to a case in which the light output amount or the energy consumption amount is measured as the usage amount of the LEDs 17, it is possible to have a simpler configuration for the counter 32, which is the usage amount measuring part.

The CPU 30 that functions as a correction processing part modifies the image signal every time the usage amount of the LEDs 17 reaches a certain cumulative value. In this manner, the chromaticity of the display image is appropriately modified periodically, making this configuration suitable in allowing an excellent display quality to be maintained.

Also, optical members 15, which apply optical effects to light from the LEDs 17 and output the light to the liquid crystal panel 11, are included, and the memory 31 stores in advance data relating to the amount of change in chromaticity of the image displayed by transmitting light through the optical members 15 in relation to the cumulative usage amount of the LEDs 17. With this configuration, light from the LEDs 17 has prescribed optical effects applied thereon as the light passes through the optical members 15 and is outputted to the liquid crystal panel 11, thus contributing to the display of an image. The optical members 15 can change the optical properties of the light that is radiated therethrough from the LEDs 17, and the chromaticity of the light that is transmitted through the optical members 15 and outputted to the liquid crystal panel 11, or in other words, the chromaticity of the image (each pixel) displayed in the liquid crystal panel 11 is also changed. Even in this case, the CPU 30 that functions as a correction processing part can modify the image signal to an appropriate value based on the data relating to the amount of change in the chromaticity of the image displayed by light transmitted through the optical members 15 in relation to the cumulative usage amount of the LEDs 17, and thus, an excellent display quality can be attained.

The optical members 15 are made of a polyester resin. Polyester resin has excellent heat resistance and mechanical strength compared to other resins, and by using this material for the optical members 15, the optical members 15 are not susceptible to changes in shape when heat or an external force is applied thereon, thus increasing the product reliability of the liquid crystal display device 10. In addition, with this configuration, even if the optical members 15 made of polyester resin are used, it is possible to modify the image signal to an appropriate value using the CPU 30 that functions as the correction processing part, and thus, an excellent display quality is attained.

The optical members 15 are made of PET (polyethylene terephthalate). Among polyester resins, PET is particularly inexpensive and is recyclable with ease, and thus, by using PET as a material for the optical members 15, it is possible to attain a liquid crystal display device 10 that is inexpensive and environmentally friendly. In addition, with this configuration, even if the optical members 15 made of PET are used, it is possible to modify the image signal appropriately using the CPU 30 that functions as the correction processing part, and thus, an excellent display quality can be attained.

The CPU 30 that functions as a second cumulative usage amount sampler is included and stores in the memory 31 as the second cumulative usage amount a count by the counter 32 when the chromaticity of the pixels is adjusted by the CPU 30 that functions as a chromaticity adjusting part. The CPU 30 that functions as a correction processing part obtains the data and the second cumulative usage amount from the memory 31 and obtains the present count by the counter 32 as the first cumulative usage amount, thus modifying the image signal. With this configuration, the count, which is obtained by the counter 32 up to when the chromaticity of the pixels is adjusted by the CPU 30 that functions as the chromaticity adjusting part, is stored in the memory 31 as the second cumulative usage amount by the CPU 30 that functions as the second cumulative usage amount sampler. The first cumulative usage amount is set as the count by the counter 32 when modification processing is conducted (present), and thus, it is possible to have a simpler configuration compared to a case in which the counter 32 is split into a counter that measures the first cumulative usage amount and a counter that measures the second cumulative usage amount.

Functions of the correction processing part and the second cumulative usage amount sampler are fulfilled by a CPU (central processing unit) 30. In this manner, it is possible to have a simpler configuration compared to a case in which the correction processing part and the second cumulative usage amount sampler are independent of each other.

The counter 32, the memory 31, and the CPU 30 are provided on the same substrate 23. If the counter 32, the memory 31, and the CPU 30 were provided on separate substrates, respectively, it would be necessary to provide wiring in order to transmit data between the substrates, whereas in the configuration of the present embodiment, such wiring lines are unnecessary, and thus, this configuration is suitable in being simpler.

The CPU 30 that functions as the second cumulative usage amount sampler stores as the second cumulative usage amount in the memory 31 the count by the counter 32 at the point when the chromaticity of the pixels was last adjusted if the chromaticity of the pixels is to be adjusted a plurality of times. With this configuration, even if the chromaticity of the pixels is adjusted a plurality of times, the CPU 30 that functions as a correction processing part can modify the image signal appropriately based on an appropriate second cumulative usage amount sampled by the CPU 30 that functions as the second cumulative usage amount sampler, thus attaining an excellent display quality.

The CPU 30 that functions as a chromaticity adjusting part adjusts the chromaticity of the pixels by adjusting the $\gamma$ value, which is a ratio of the brightness of the pixels to the input gradation level of the image signal. With this configuration, by having the CPU 30 that functions as the chromaticity adjusting part adjust the $\gamma$ value, the chromaticity of each pixel is adjusted appropriately, and it is thus possible to attain excellent image chromaticity.

Also, based on the $\gamma$ values, the input gradation level of the image signal is converted to a converted gradation level that has a linear relation to the output gradation level of the pixels, and the gradation conversion circuit (gradation conversion part) 28, which outputs the converted signal based on the converted gradation level to the liquid crystal panel 11, is provided. With this configuration, the converted signal, which is based on the converted gradation level converted based on the $\gamma$ values adjusted by the CPU 30 that functions as the chromaticity adjusting part, is outputted to the liquid crystal panel 11, thus allowing an image with an appropriate chromaticity to be displayed in the liquid crystal panel 11.

Also, the timing controller 29, which outputs the converted signal outputted from the gradation conversion circuit 28 according to a prescribed timing to the liquid crystal panel 11, is provided. With this configuration, it is possible to display an image with an appropriate chromaticity in the liquid crystal panel 11 by having the timing controller 29 output the converted signal to the liquid crystal panel 11 at an appropriate timing.

Also, the liquid crystal panel 11 includes a plurality of pixels corresponding to colors differing from each other, and an image is displayed based on a plurality of image signals corresponding to each of the colors of the pixels, while the CPU 30 that functions as the chromaticity adjusting part adjusts the white balance of the image by adjusting the γ value for each of the colors. With this configuration, it is possible to appropriately adjust the white balance of the image constituted of the respective pixels using the CPU 30 that functions as the chromaticity adjusting part.

Also, the light source is the LEDs 17. With this configuration, it is possible to achieve higher brightness, lower energy consumption, and the like.

The optical members 15, which output light from the LEDs 17 to the liquid crystal panel 11 while applying optical effects on the light, are provided, and the LEDs 17 are each constituted of an LED chip (LED element) that emits substantially only blue light, and a fluorescent material that emits light by being excited by the light from the LED chip. With this configuration, light emitted from the LEDs 17 includes a large amount of light in the blue wavelength region. Light in the blue wavelength region has a tendency to change the optical properties of the optical members 15. As a countermeasure, the CPU 30 that functions as a correction processing part can modify the image signal appropriately to deal with changes in optical properties of the optical members 15 resulting from light from the LEDs 17, thus allowing a high display quality to be maintained.

The light guide member 19, which has edges disposed facing the LEDs 17 and guides light from the LEDs 17 to the liquid crystal panel 11, is provided. With this configuration, light emitted from the LEDs 17 is guided to the liquid crystal panel 11 and efficiently outputted after entering the edges of the light guide member 19, which face the LEDs 17.

Embodiment 2

Embodiment 2 of the present invention will be described with reference to FIGS. 18 and 19. In Embodiment 2, there are two counters 132. Descriptions of structures, operations, and effects similar to those of Embodiment 1 will be omitted.

Figure 18:
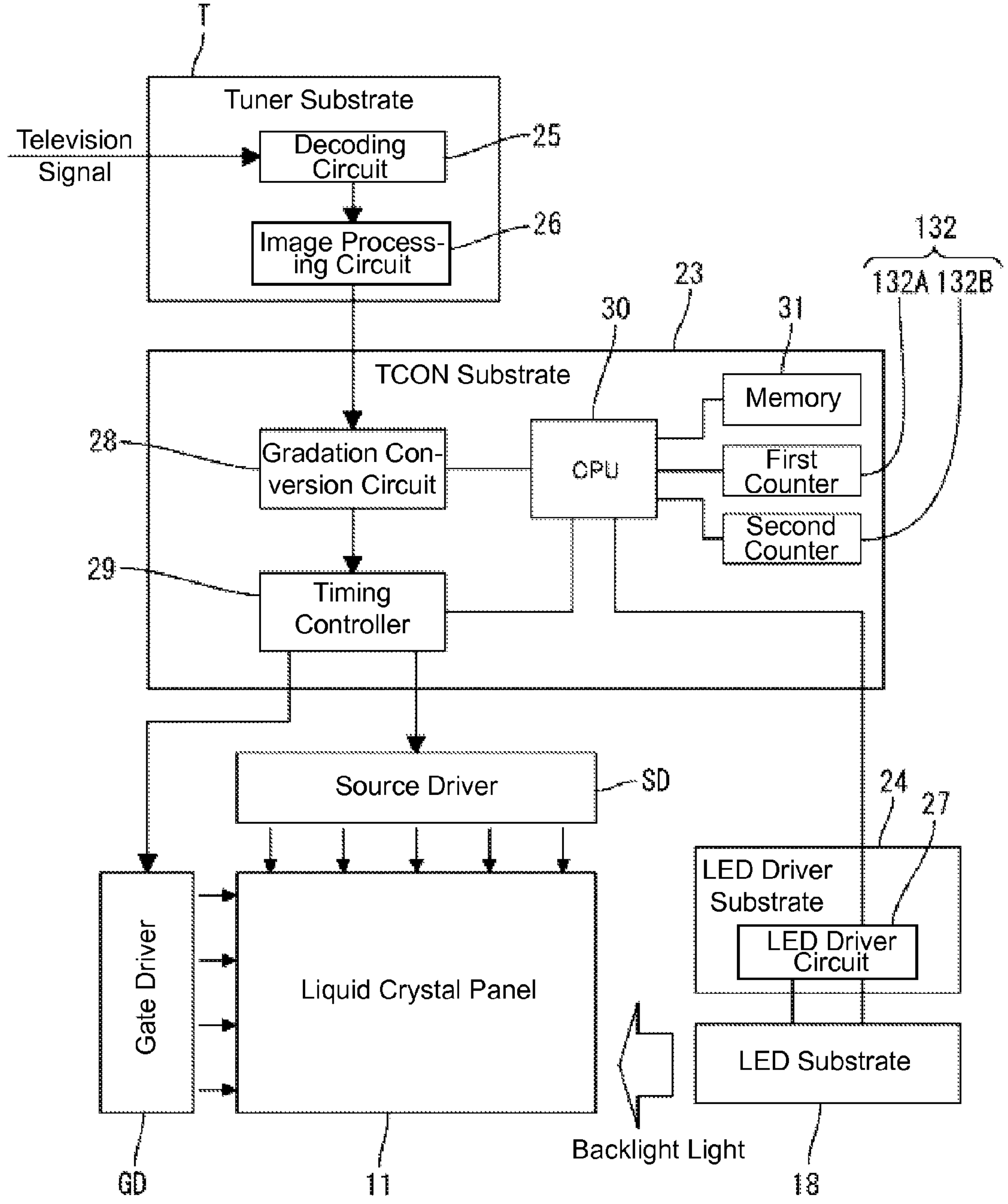
FIG. 18 is a block diagram that shows relations between each component involved in image display according to Embodiment 2 of the present invention.
Figure 19:
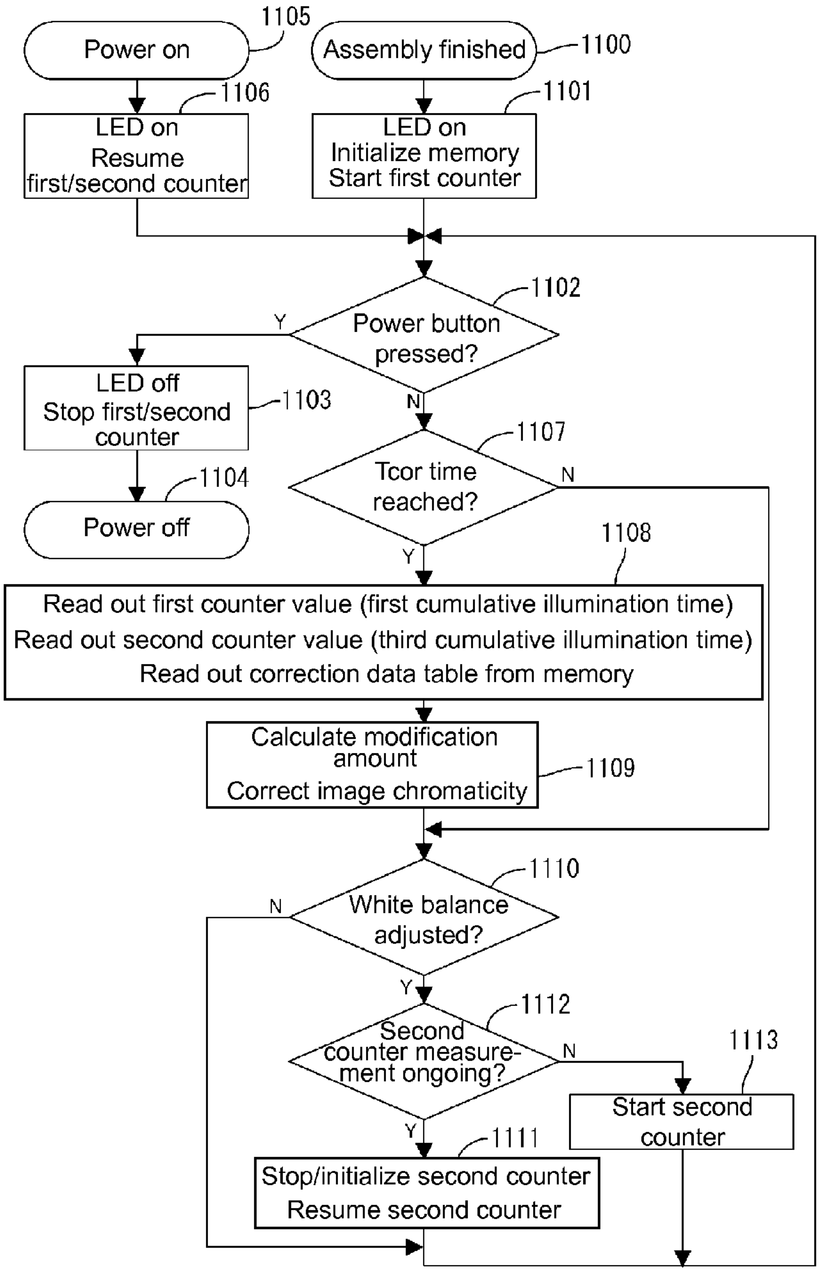
FIG. 19 is a flow chart that shows steps to be conducted when modifying the chromaticity of the image based on the correction data table, the first cumulative illumination time, and a third cumulative illumination time.

As shown in FIG. 18, the counters 132 of the present embodiment include a first counter 132A and a second counter 132B, and counts of the counters 132A and 132B can be read out by a CPU 30. The first counter 132A is similar to the counter 32 of Embodiment 1 in measuring the cumulative illumination time from when illumination of the LEDs 17 is started (initial start of illumination) to the present after assembly of the liquid crystal display device 10 is finished. On the other hand, the second counter 132B measures the cumulative illumination time of the LEDs 17 from directly after white balance adjustment is conducted to the present.

As for specific steps relating to chromaticity modification, descriptions will be made with reference to the flowchart in FIG. 19 of points that differ from Embodiment 1. In step 1108, when modifying the chromaticity of the image, the CPU 30 reads out a correction data table stored in a memory 31, reads out a count from the first counter 132A as a first cumulative illumination time, and reads out a count from the second counter 132B as a third cumulative illumination time. Next, in step 1109, the value to which the chromaticity is to be modified is calculated based on the read out data. Specifically, first, the first cumulative illumination time is compared to the correction data table stored in the memory 31, thus determining the Δx and Δy corresponding to the first cumulative illumination time as the first change amounts of the chromaticity of the image. On the other hand, the third cumulative illumination time is subtracted from the first cumulative illumination time, thus calculating the cumulative illumination time of the LEDs 17 from when illumination of the LEDs 17 is started to when white balance adjustment was conducted, or in other words, the second cumulative illumination time. Then the second cumulative illumination time is compared to the correction data table, thus determining the Δx and Δy corresponding to the second cumulative illumination time as the second change amount of the chromaticity of the image. In this manner, based on the determined first change amount and second change amount, calculations similar to those of Embodiment 1 are conducted, thus obtaining the x value and the y value of to which the chromaticity is to be modified. Thus, in the present embodiment, it is possible to determine the value to which the chromaticity is to be modified without storing the second cumulative illumination time in the memory 31.

In step 1110, it is determined whether or not white balance adjustment has been conducted. If the answer is "YES," in step 1112, it is determined whether or not the second counter is currently conducting measurement, and if the answer is "NO", then measurement by the second counter 132B is started (step 1113), and if the answer is "YES", then the measurement by the second counter 132B is stopped, and the measurement by the second counter 132B is resumed after initializing the count (1111). As a result, even if white balance adjustment is conducted a plurality of times, it is possible to measure the cumulative illumination time by the second counter 132B from after the aforementioned adjustment was last conducted.

Embodiment 3

Figure 20:
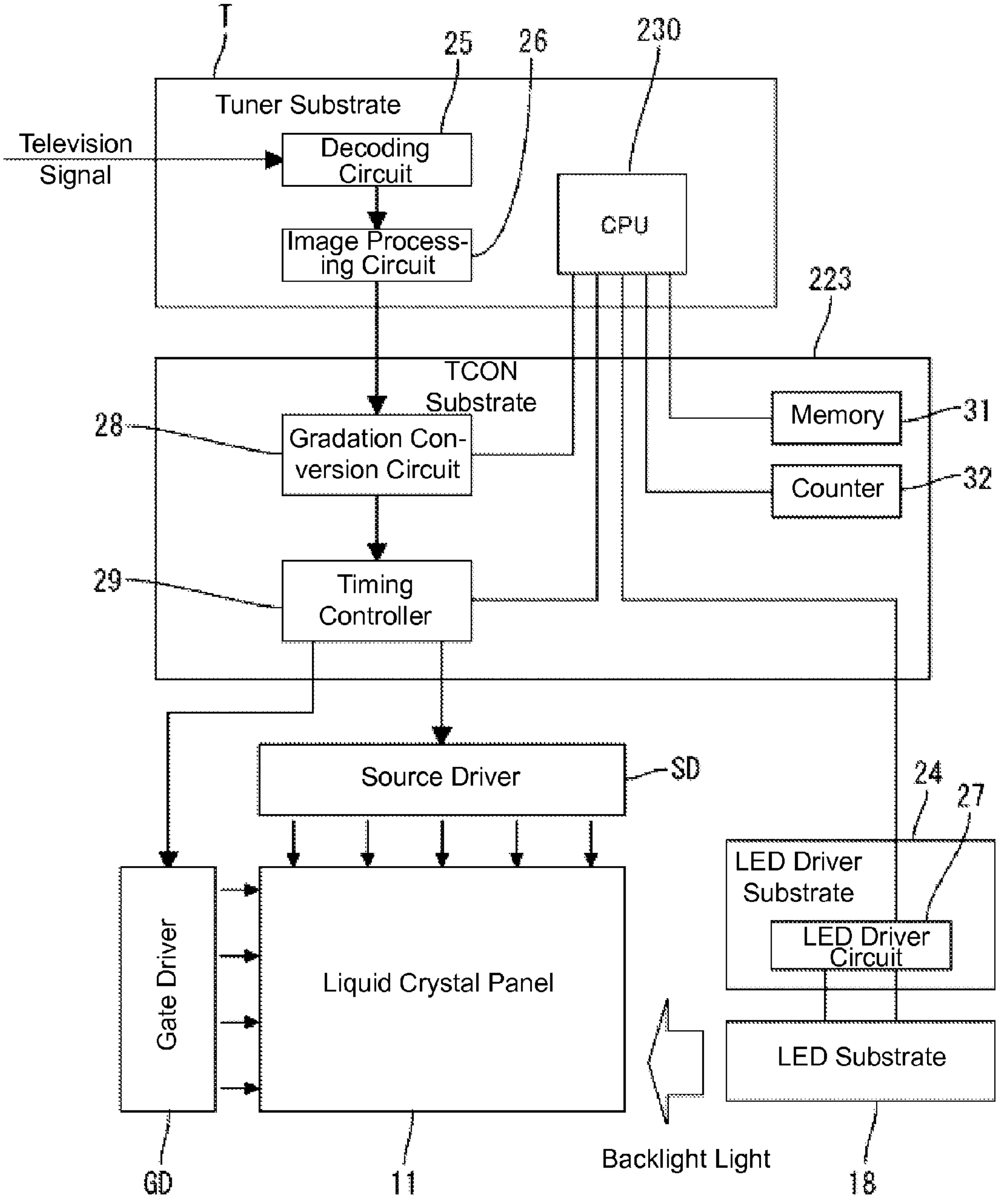
FIG. 20 is a block diagram that shows relations between each component involved in image display according to Embodiment 3 of the present invention.

Embodiment 3 of the present invention will be described with reference to FIG. 20. In Embodiment 3 a CPU 230 is provided on a tuner substrate T. Descriptions of structures, operations, and effects similar to those of Embodiment 1 will be omitted.

The CPU 230 of the present embodiment is provided not on a TCON substrate 223 but on the tuner substrate T, and can control the driving of the TCON substrate 223 and the LED driver substrate 24 connected to the CPU 230 via wiring lines. A gradation conversion circuit 28, a timing controller 29, a memory 31, and a counter 32 provided on the TCON substrate 223, and an LED driver circuit 27 provided on the LED driver substrate 24 respectively work together with the CPU 230 on the tuner substrate T, thus allowing chromaticity modification of the image to be conducted in a similar manner to Embodiment 1.

Other Embodiments

The present invention is not limited to the embodiments shown in the drawings or described above, and the following embodiments are also included in the technical scope of the present invention, for example.

(1) In the embodiments above, the CPU, the memory, and the counter were shown as independent circuit elements, but the present invention also includes a configuration in which functions of the CPU, the memory, and the counter are all included in one circuit element (integrated circuit element). In such a case, other functions (a gradation conversion circuit function, for example) can further be added to the integrated circuit element.

(2) In the embodiments above, the counter measured the cumulative "illumination time (h)" as the LED usage amount, but the present invention includes configurations in which the counter measures the total "illumination light amount (lm·h)" or "amount of consumed energy (W·h)" as the LED usage amount. Of these, as for the total illumination light amount, the illumination time of the LEDs is measured, and additionally, a photosensor that detects light from the LEDs is provided in the backlight device, allowing the illumination light amount to be measured by the photosensor. On the other hand, as for the total consumed energy, the counter measures the illumination time of the LEDs, and the current and voltage supplied to the LED substrates (LED driver circuit) are measured by an electric power measuring circuit.

(3) In the embodiments above, chromaticity modification, which has the purpose of maintaining the chromaticity of the image at the same level as when white balance adjustment is conducted, was conducted periodically whenever the cumulative illumination time of the LEDs reached a certain value (Tcor), but the cumulative illumination time of the LEDs, which is the basis of chromaticity modification, may be set randomly, thus conducting chromaticity modification non-periodically. Alternatively, chromaticity modification may be conducted only once, with no periodic updates.

(4) In the embodiments above, the CPU functions as a correction processing part, a chromaticity adjusting part, and a second cumulative usage amount sampler, but any one, two, or all of the functions including the correction processing part, the chromaticity adjusting part, and the second cumulative usage amount sampler may be fulfilled by parts other than the CPU.

(5) In the embodiments above, the memory stores at least the correction data table and the γ values, but at least two memories may be provided, one memory storing the correction data table, and the other memory storing the γ values.

(6) In Embodiments 1 and 3, the CPU is provided on the TCON substrate or the tuner substrate, but the present invention includes a configuration in which the CPU is provided on the LED driver substrate. Also, the memory and counter may be provided on a substrate other than the TCON substrate (such as the tuner substrate and the LED driver substrate).

(7) In the embodiments above, white balance adjustment is conducted in order to adjust the chromaticity of the image, but the present invention can be applied to a case in which chromaticity adjustment is conducted by a method other than white balance adjustment.

(8) In the embodiments above, PET, which is a type of polyester resin, is used as the transparent base material of the prism sheet, which is an optical member, but PBT (polybutylene terephthalate), PEN (polyethylene naphthalate), and the like, which are types of polyester resin, can be used. The above-mentioned materials can also be used in the prism layer.

(9) In the embodiments above, a polyester resin is used as the material for the transparent base material of the prism sheet, which is an optical member, but other resin materials that can be used for the transparent base material include an AS resin (acrylonitrile/styrene copolymer), an acrylic resin, PS (polystyrene), PP (polypropylene), PC (polycarbonate), and the like. The above-mentioned materials can also be used in the prism layer.

(10) In the embodiments above, a prism sheet is included among the optical members, but the present invention can be applied to a configuration in which the prism sheet is not included among the optical members. Optical members other than a prism sheet (specifically, a diffusion plate, a diffusion sheet, a microlens sheet, a reflective polarizing sheet, and the like) and the light guide member also have a shift in chromaticity in the transmitted light (displayed image) due to the optical properties of the optical members changing due to the illumination light of the LEDs. Thus, by applying the present invention to such a configuration without a prism sheet, the same operations and effects as those of the embodiments above can be attained.

(11) In the embodiments above, two optical sheets were used as the optical members, but the number of optical sheets can be appropriately changed to a number other than two (one or less, or three or greater). It is possible to have a configuration in which a diffusion plate, which is an optical member, is not used.

(12) In the embodiments above, a pair of LED substrates (LEDs) are disposed on both short sides of the light guide member, but the present invention also includes a configuration in which a pair of LED substrates (LEDs) are disposed on both long sides of the light guide member, for example.

(13) Besides (12), the present invention includes a case in which two pairs of LED substrates (LEDs) are respectively provided on both long sides and both short sides of the light guide member, and a case in which only one LED substrate (LEDs) is provided on one long side or one short side of the light guide member.

(14) In the embodiments above, the colored parts of the color filters provided in a liquid crystal panel included the three colors of R, G, and B, but it is possible to have the colored parts include four or more colors. In such a case, the number of types of image signals only needs to match the number of colors of the colored parts (four or more types), and each TFT only needs to be driven according to the image signal of each color. If using four colors for the colored parts, for example, it is preferable that Y (yellow) be used in addition to R, G, and B.

(15) In the embodiments above, an edge light-type backlight device that has a light guide member is used, but the present invention includes a case in which a so-called direct light-type backlight device in which a light guide member is omitted and LEDs (light sources) are disposed directly below the liquid crystal panel is used.

(16) In the embodiments above, a type of LED was used in which an LED chip that only emits blue light is covered by a fluorescent material, thus emitting substantially white light, but the present invention includes a case in which an LED has an LED chip that emits only ultraviolet light (blue-violet light) covered by a fluorescent material, thus emitting substantially white light.

(17) In the embodiments above, an LED is used in which an LED chip that only emits blue light is covered by a fluorescent material, thus emitting substantially white light, but the present invention includes a case in which the LED includes three types of LED chips that respectively emit red light, green light, and blue light. The present invention also includes an LED that has three types of LED chips that respectively emit C (cyan), M (magenta), and Y (yellow).

(18) In the embodiments above, LEDs are used as the light source, but it is apparent that other types of light sources (cold cathode ray tube, hot cathode ray tube, organic EL, or the like) can be used.

(19) In the embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(20) In the embodiments above, a liquid crystal display device using a liquid crystal panel as a display panel was described, but the present invention is applicable to a display device that uses another type of display panel.

(21) In the embodiments above, a television receiver including a tuner substrate was described as an example, but the present invention can be applied to a display device that does not include a tuner substrate.

DESCRIPTION OF REFERENCE CHARACTERS

10 liquid crystal display device (display device)
11 liquid crystal panel (image display part)
15 optical member
17 LED (light source)
19 light guide member
23 TCON substrate (substrate)
28 gradation conversion circuit (gradation conversion part)
29 timing controller
30, 230 CPU (correction processing part, chromaticity adjusting part, second cumulative usage amount sampler)
31 memory
32, 132 counter (usage amount measuring part)
132A first counter (usage amount measuring part)
132B second counter (usage amount measuring part)
TV television receiver

The invention claimed is:

1. A display device, comprising:
an image display part having a plurality of pixels for displaying an image based on an image signal;
a chromaticity adjusting part that adjusts chromaticity of the pixels;
a light source that supplies light to the image display part;
a usage amount measuring part that measures a cumulative usage amount of the light source;
a memory that stores in advance data relating to an amount of chromaticity change in relation to the cumulative usage amount of the light source; and
a correction processing part that conducts a process to modify the image signal based on the data stored in the memory and the cumulative usage amount of the light source measured by the usage amount measuring part, to compensate for chromaticity shift over time,
wherein the correction processing part determines a first chromaticity change amount from the data stored in the memory, with reference to a first cumulative usage amount that is a total cumulative usage amount of the light source measured by the usage amount measuring part up to the present, the correction processing part determines a second chromaticity change amount from the data stored in the memory, with reference to a second cumulative usage amount that is measured by the usage amount measuring part and that is a cumulative usage amount of the light source up to when the chromaticity of the pixels was adjusted by the chromaticity adjusting part, and the correction processing part obtains a target value to which chromaticity modification is performed by subtracting the second chromaticity change amount from the first chromaticity change amount, and modifies the image signal based on the target value to which the chromaticity modification is to be performed.

2. The display device according to claim 1, wherein the usage amount measuring part measures a cumulative illumination time as the usage amount of the light source.

3. The display device according to claim 1, wherein the correction processing part conducts the process to modify the image signal every time the cumulative usage amount of the light source reaches a certain value.

4. The display device according to claim 1, further comprising an optical member that applies an optical effect on light from the light source and outputs the light to the image display part,
wherein the memory stores in advance data relating to the amount of chromaticity change in an image displayed by transmitting light through the optical member, in relation to the cumulative usage amount of the light source.

5. The display device according to claim 4, wherein the optical member is made of a polyester resin.

6. The display device according to claim 5, wherein the optical member is made of polyethylene terephthalate.

7. The display device according to claim 1, further comprising a second cumulative usage amount sampler that stores in the memory as the second cumulative usage amount a measured value measured by the usage amount measuring part up to a point in time when chromaticity of the pixels is adjusted by the chromaticity adjusting part,
wherein the correction processing part conducts the process to modify the image signal by obtaining the data and the second cumulative usage amount from the memory, and obtaining a present value measured by the usage amount measuring part as the first cumulative usage amount.

8. The display device according to claim 7, wherein functions of the correction processing part and the second cumulative usage amount sampler are fulfilled by a central processing unit.

9. The display device according to claim 8, wherein the usage amount measuring part, the memory, and the central processing unit are provided on a same substrate.

10. The display device according to claim 7, wherein the second cumulative usage amount sampler stores in the memory as the second cumulative usage amount a measured value measured by the usage amount measuring part up to a point in time when the chromaticity of the pixels is last adjusted, if the chromaticity of the pixels is to be adjusted a plurality of times.

11. The display device according to claim 1, wherein the chromaticity adjusting part adjusts the chromaticity of the pixels by adjusting a $\gamma$ value that is a ratio of a brightness of the pixels to an input gradation level of the image signal.

12. The display device according to claim 11, further comprising a gradation conversion part that converts the input gradation level of the image signal based on the $\gamma$ value to a converted gradation level that has a linear relation to an output gradation level of the pixels, the gradation conversion part outputting a converted signal based on the converted gradation level to the image display part.

13. The display device according to claim 12, further comprising a timing controller that outputs the converted signal outputted from the gradation conversion part to the image display part at a prescribed timing.

14. The display device according to claim 11, wherein the image display part includes the plurality of pixels with respective colors differing from each other, and displays the image based on a plurality of said image signals corresponding to the pixels of the respective colors, whereas the chromaticity adjusting part adjusts a white balance of the image by adjusting the $\gamma$ value for each color.

15. The display device according to claim 1, wherein the light source is an LED.

16. The display device according to claim 15, further comprising an optical member that applies an optical effect on light from the LED, the optical member outputting the light to the image display part, wherein the LED is constituted of an LED element that emits substantially only blue light, and a fluorescent material that is excited by light from the LED element, thereby emitting light.

17. The display device according to claim 1, further comprising a light guide member that is disposed such that an edge thereof faces the light source and that guides light from the light source to the image display part.

18. The display device according to claim 1, wherein the image display part is a liquid crystal panel constituted of a pair of substrates with liquid crystal sealed therebetween.

19. A television receiver, comprising the display device according to claim 1.

* * * * *